United States Patent
Yamori et al.

(10) Patent No.: US 6,816,617 B2
(45) Date of Patent: Nov. 9, 2004

(54) MOTION VECTOR SEARCHER AND MOTION VECTOR SEARCH METHOD AS WELL AS MOVING PICTURE CODING APPARATUS

(75) Inventors: Akihiro Yamori, Kawasaki (JP); Kiyoshi Sakai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 679 days.

(21) Appl. No.: 09/737,488

(22) Filed: Dec. 18, 2000

(65) Prior Publication Data

US 2001/0021272 A1 Sep. 13, 2001

(30) Foreign Application Priority Data

Jan. 7, 2000 (JP) ........................................ 2000-001691

(51) Int. Cl.$^7$ ............................. G06K 9/00; G06K 9/36; G06K 9/46; H04N 7/12; H04N 11/02
(52) U.S. Cl. ........................ 382/236; 382/107; 382/239; 375/240.02; 348/407.1
(58) Field of Search ................................. 382/107, 236, 382/239; 375/240, 240.01, 240.08, 240.12–240.16, 240.2, 240.22–240.24; 348/384.1, 390.1, 407.1, 413.1, 699

(56) References Cited

U.S. PATENT DOCUMENTS

| | | | |
|---|---|---|---|
| 4,691,230 A | | 9/1987 | Kaneko et al. ............. 358/105 |
| 5,068,722 A | * | 11/1991 | Sugiyama ................. 348/420.1 |
| 5,212,548 A | * | 5/1993 | de Haan et al. .......... 348/416.1 |
| 5,485,224 A | * | 1/1996 | Burns et al. ................ 348/696 |
| 5,748,231 A | * | 5/1998 | Park et al. ............. 348/207.99 |
| 6,078,618 A | * | 6/2000 | Yokoyama et al. ......... 375/240 |
| 6,456,337 B1 | * | 9/2002 | Kobayashi et al. ......... 348/701 |

FOREIGN PATENT DOCUMENTS

| | | |
|---|---|---|
| JP | SHO 61-200789 | 9/1986 |
| JP | HEI 02-134085 | 5/1990 |
| JP | HEI 8-079767 | 3/1996 |
| JP | HEI 11-215504 | 8/1999 |

* cited by examiner

Primary Examiner—Leo Boudreau
Assistant Examiner—Hussein Akhavannik
(74) Attorney, Agent, or Firm—Staas & Halsey LLP

(57) ABSTRACT

The invention provides a motion vector searcher which includes an inter-block difference arithmetic operation section for calculating and outputting difference amounts between an original image MB and a plurality of search MBs, an additional amount arithmetic operation section for outputting a correction difference amount obtained by adding an additional amount, which relies upon a horizontal component and a vertical component of each of the motion vectors and a state of coding, to each of the difference amounts and for outputting a motion vector based on the motion vector, and a motion vector determination section for determining an optimum motion vector which exhibits the highest one of correlation degrees between the original image MB and the search MBs. With this arrangement, reduction of the information amount of motion vectors is achieved when the compression ratio is high and the transmission rate is low.

14 Claims, 21 Drawing Sheets

FIG. 13

| SYSTEM | TOTAL GENERATION INFORMATION AMOUNT | MOTION VECTOR GENERATION INFORMATION AMOUNT | MOTION VECTOR INFORMATION AMOUNT RATIO (%) | AVERAGE QUANTIZATION SCALE |
|---|---|---|---|---|
| CONVENTIONAL SYSTEM | 19413344 | 15554488 | 80.1 | 49.2 |
| INVENTIVE SYSTEM | 19440400 | 6651096 | 34.2 | 60.1 |

MOTION VECTOR SEARCHER AND MOTION VECTOR SEARCH METHOD AS WELL AS MOVING PICTURE CODING APPARATUS

BACKGROUND OF THE INVENTION

1) Field of the Invention

This invention relates to a motion vector searcher and a motion vector search method as well as a moving picture coding apparatus suitable for use for motion vector detection, for example, in digital moving picture coding.

2) Description of the Related Art

In recent years, a service of distributing images of a high picture quality in multiple channels is carried out in broadcasting media such as satellite broadcasting and a CATV (Cable Television of Community Antenna Television System), and a compression technique called MPEG (Moving Picture Experts Group) has been developed.

A moving picture has various redundancies. For example, according to an image pickup method called panning, since an image of an object which is stationary on a screen is picked up while the orientation of a camera is varied with the object fixed, the object appearing on a screen at present and the object appearing on a succeeding screen exhibit no significant difference of data regarding the image. Accordingly, the image is first converted into data only with regard to a portion which relates to motion information of the object.

Here, several terms used in the present specification are defined in the following manner. The screen is what a physical display apparatus displays, and the image is an object such as a body, a landscape and so forth which are included in the screen. Further, the picture element is a point on the screen which corresponds to the resolution of the image and has a value called luminance value or color difference value. A pixel of, for example, a personal computer corresponds to the picture element.

A still picture has a spatial redundancy that adjacent pixels are similar to each other. For example, where the pattern of the screen is plain and in full white, the color of an adjacent picture element can be analogized more readily than where the pattern of the screen includes two different colors of white and red.

On the other hand, a moving picture has a temporal redundancy that similar pictures successively appear with respect to time. The temporal redundancy has a characteristic that the luminance value of a certain picture element has a high correlation to the luminance value of a neighboring picture element in time. For example, in the movie, images which are different a little from each other are successively displayed to present a dynamic image, and therefore, preceding and succeeding pictures in time are similar to each other.

Therefore, the MPEG system has two different functions of DCT (Discrete Cosine Transform) for removing a spatial redundancy of a still picture and motion compensation (MC) for removing a temporal redundancy of a moving picture. Here, to remove a spatial redundancy signifies to convert an image into frequency components using orthogonal transform (for example, DCT) to eliminate high frequency components to reduce the amount of information to be transmitted.

Meanwhile, to remove a temporal redundancy signifies to determine differences between frames without using compression within a frame (intra-frame compression which is hereinafter described) and encode the difference information. Encoding of such difference information is more effective to reduce the amount of information than use only of the intra-frame compression. In particular, where a motion search which is hereinafter described is performed to select a position at which the difference is comparatively small, the information amount can be reduced more effectively than where the difference of a block at the same position between frames is calculated. It is to be noted that the difference is represented, for example, as (10, 15) and also called motion vector, and is expressed, for example, from a variable length code (VLC) having a value ranging from −16 to +15 and an f code.

The DCT is a process of dividing an original image into square macro blocks (a macro block may be hereinafter referred to simply as MB) of 16×16 picture elements and decompose each MB into different frequency components from a low frequency component to a high frequency component. The DCT can convert a distribution of luminance values which are random on the frequency axis into another distribution in which the frequency components appear in a concentrated manner in a low frequency region. Further, the DCT can eliminate high frequency components and thus allows information compression. Further, the compression ratio in such information compression can be changed as hereinafter described.

The motion compensation signifies a method of determining a difference between the position shifted by a fixed value from a picture (also called coded picture), which is an image processing unit, and a coded picture of an object of compression. Here, the picture signifies an individual still picture from still pictures of a moving picture and specifically indicates a frame or a field. The frame and the field arise from a difference in scanning method, and in the following description, the picture is used with a higher concept than the frame and the field. A difference between the frame and the field is hereinafter described above.

A method of obtaining a motion vector is called motion search and is performed by comparison between an original image and a reference image. First, an original image MB is determined from a single original image, and a quadrilateral region of a reference image different from the original image is determined as a search range. Then, a search MB (reference MB) of the same size as that of the original image MB is selected from within the search range, and the search MB is shifted within the range from −16 to +15 both horizontally and vertically. Then, differences between the original image MB and the shifted search MBs are calculated each as a sum of absolute values (absolute value sum) or a square sum, and a relative position of that one of the search MBs at which the lowest difference value is obtained within the ranges is determined. Accordingly, the arithmetic operation of the difference is performed, for example, by 256 times.

It is to be noted that the search range in the following description is, for example, from −16 to +15 MB distances in both of the horizontal and vertical directions. However, the motion search number may otherwise be set to a value different from 256. The MPEG system provides, for example, also a scheme called half pel motion compensation, by which also a motion vector (−3.5, 5.5) or the like can be produced. In the following description, the difference amount is sometimes used to signify the difference value.

FIG. 16 illustrates a motion search. Referring to FIG. 16, an MB 100a is provided in an original image picture 100, and a search range 110a is provided in a reference picture 110. A motion search is performed centered at the position of the MB 10a, and difference calculation between the MB 100a and a shifted MB 110b for each picture element in the search range 110a is performed.

FIG. 17 illustrates a motion vector. An outer framework shown in FIG. 17 is a range (the search range 110a) of the reference picture 110 for which a search is performed. Here, an arrow mark which is directed in the left upper direction is a motion vector 111, and an MB 110c is at the same position as that of the MB 100a in the original image picture 100 (refer to FIG. 16) while the MB 110b is at a position at which the motion search evaluation value exhibits its smallest value within the search range 110a. Such motion search evaluation values are calculated based on individual difference amounts obtained by raster scanning by which the search position is successively shifted one by one MB distance from the left upper corner of the search range 110a, and the lowest value of the motion search evaluation values is determined as a motion vector.

FIG. 18 illustrates block matching, and the block matching is described with reference to FIG. 18. A motion searcher 120 shown in FIG. 18 is connected to a frame memory 121a and another frame memory 121b. A plurality of search MBs are inputted from the frame memory 121a to the motion searcher 120, and a plurality of original images MB are inputted from the frame memory 121b to the motion searcher 120. The motion searcher 120 includes a plurality of inter-block difference arithmetic operation circuits 120a, 120b, . . . , 120c which individually calculate difference amounts between the original MB and the search MBs. Results of the calculation are outputted from the inter-block difference arithmetic operation circuits 120a, 120b, . . . , 120c, and the lowest value is selected from among the plurality of calculation results by a comparator 120d and outputted as a motion search result.

As an arithmetic operation method for block matching, an absolute value sum of difference amounts, a square sum of difference amounts or the like can be used, and the number of such values is equal to the number of shifting operations or shifted positions within the search range. Where the inter-block difference arithmetic operation means shown in FIG. 18 is formed from a difference absolute value sum arithmetic operation circuit, it has such a construction as shown in FIG. 19.

FIG. 19 is a block diagram of the difference absolute value sum arithmetic operation circuit. In the difference absolute value sum arithmetic operation circuit 122 shown in FIG. 19, a difference between an original MB picture element 1 from the frame memory 121b and a reference picture element 1 from the frame memory 121b is calculated by a subtractor 122a, and an absolute value of the difference is obtained by an absolute value arithmetic operator (represented as absolute value in FIG. 19) 122d and inputted to an cumulative adder 122g.

Similarly, a difference between an original image MB picture element 2 and a reference picture element 2 is calculated by a subtractor 122b, and an absolute value of the difference is obtained by an absolute value arithmetic operator (absolute value) 122e and inputted to the cumulative adder 122g. Further, a difference between an original image MB picture element N and a reference picture element N is calculated by a subtractor 122c, and an absolute value of the difference is obtained by an absolute value arithmetic operator (absolute value) 122f and inputted to the cumulative adder 122g. Further, the absolute values outputted from the absolute value arithmetic operators 122d, 122e, . . . , 122f are cumulatively added by the cumulative adder 122g, and a resulting sum value is outputted from the cumulative adder 122g. Here, the picture element numbers 1, 2, . . . , N are order numbers in raster scanning of an MB, and N is an integer representative of the number of picture elements in the MB.

FIG. 20 is a block diagram of a difference square sum arithmetic operation circuit. The difference square sum arithmetic operation circuit 123 shown in FIG. 20 is similar to the absolute value arithmetic operator 122d shown in FIG. 19 but is different in a square sum arithmetic operator (square value) 123b therein. In particular, a difference between an original MB picture element 1 from the frame memory 121b and a reference picture element 1 from the frame memory 121a is calculated by a subtractor 123a, and a square value of the difference from the subtractor 123a is obtained by the square sum arithmetic operator 123b and inputted to a cumulative adder 123c. The cumulative adder 123c cumulatively adds the square value outputted from the square sum arithmetic operator 123b and square values outputted from the other square sum arithmetic operators and outputs a resulting value. The picture element numbers 1, 2, . . . , N are order numbers in raster scanning of an MB, and N is an integer representative of the number of picture elements in the MB.

A motion search in the MPEG system is performed in such a manner as described above, and a motion vector is sent out together with coded image difference information.

Now, a frame and a field which are lower concepts of a picture are described together with differences in scanning method. A frame is a still picture from among still pictures in a moving picture, and a field is an image produced by a cycle of scanning. A frame and a field are based on a difference in scanning method of a moving picture.

Scanning methods for a moving picture are classified into non-interlace scanning and interlace scanning. According to the non-interlace scanning, a frame is composed of picture elements all obtained by sampling at the same time. In contrast, according to the interlace scanning, an image in a frame is composed of even-numbered picture elements and odd-numbered picture elements obtained separately at different timings from each other, and one frame is composed of two images including an image at present and another image immediately preceding (in the past) to the image at present. The images sampled at such different timings are individually called first field and second field, and a frame obtained by interlace scanning is usually composed of two field images.

In other words, the non-interlace scanning produces one frame by a single scanning cycle without separating scanning lines whereas the interlace scanning produces one frame by two scanning cycles.

Thus, one frame is allocated or two fields are allocated to one picture. It is to be noted that the former is called frame structure, and the latter is called field structure. Consequently, an image is coded not only as a frame but also as a field, and accordingly, the image is coded efficiently.

Further, methods for coding pictures are classified into intra-picture coding (intra coding) and inter-picture coding (inter coding). In the intra-picture coding, coding is performed only within one picture independently, and the coding is performed in the same order as that of an original image without performing prediction upon coding (prediction coding).

On the other hand, according to the inter-picture coding, an inter-picture difference between a picture at present and an already coded picture is calculated and then coded. As a flow of operations in the inter-picture coding, motion compensation is performed in a unit of an MB, and the position at which pictures are most similar is searched out, and the difference from the position is coded.

In practical use, where the intra-picture coding is superior in efficiency to the inter-picture coding, the intra-picture coding is selectively performed even if the inter-picture coding has been used till then. It is to be noted that such intra discrimination/inter discrimination is performed in a unit of an MB.

Further, different kinds of pictures with regard to prediction are described. According to the MPEG system, a group called GOP (Group Of Pictures) is provided, and regeneration of pictures is performed using bidirectional prediction for each group. The pictures which form a GOP have three different picture types, i.e., an I picture (intra-coded picture), a P picture (predictive-coded picture) and a B picture (bidirectionally predictive-coded picture). Thus, such motion compensation, DCT and so forth as described above are performed for each frame or field. It is to be noted that images referred to by a P picture and a B picture are different between the frame structure and the field structure.

Similarly, also the DCT is performed separately for the frame structure and the field structure, and frame DCT and field DCT are calculated. Thus, a motion vector for a frame and a motion vector for a field are available. Also prediction methods are classified into frame prediction and field prediction.

Then, image data are compressed by variable length coding (entropy coding). The variable length coding is applied for the appearance frequency of each code. In particular, a picked up image is DCT transformed, and coefficients obtained by the DCT are much different in appearance frequency. Therefore, in processing of DCT coefficients or components of a motion vector, a shorter code length is allocated to a value having a higher appearance frequency while a longer code length is allocated to a value having a lower appearance frequency to reduce the average information amount.

For example, if the appearance frequencies of 0, 1, 2 and 3 are 0.6, 0.2, 0.1 and 0.1, then they are allocated to fixed length codes of two figures like 00, 01, 10 and 11, and the average code length of the codes is 2 bits as obtained from the following expression (1):

$$\text{Average code length} = 2 \times 0.6 + 2 \times 0.2 + 2 \times 0.1 + 2 \times 0.1 = 2 \text{ (bits)} \quad (1)$$

On the other hand, where the appearance frequency is equal, if 0 of 1 bit is allocated to 0 which has the highest appearance frequency and 10 of 2 bits is allocated to 1 which has the second highest appearance frequency and then 111 of 3 bits is allocated to 2 and 3 which have the lowest appearance frequency, then the average code length is such as given by the following expression (2):

$$\text{Average code length} = 1 \times 0.6 + 2 \times 0.2 + 3 \times 0.1 + 3 \times 0.1 = 1.6 \text{ (bits)} \quad (2)$$

Consequently, the variable length coding is advantageous and contributes compression.

It is to be noted that the standardization work regarding the MPEG system is performed by the JTC1 (Joint Technical Committee 1) managed jointly by the ISO (International Organization for Standardization) and the IEC (International Eletrotechnical Commission), and for standards for a moving picture, the MPEG4 is proceeded in addition to the MPEG1 and the MPEG2. The SC29 in the SC (Subcommittee) which is a subordinate organization of the JCT1 is engaged in standardization of a digital moving picture. More particularly, the SC29 defines the ISO/IEC 11172-2 and so forth regarding the coding system of an MPEG1 moving picture, and defines the ISO/IEC 13818-2 and so forth with regard to the coding system for an MPEG2 moving picture.

Subsequently, a compression circuit which employs the MPEG system is described. In the following, unless otherwise specified, processing in the MPEG2 system is described.

FIG. 21 is a block diagram of an MPEG coding apparatus. In the MPEG coding apparatus 150 shown in FIG. 21, original image data are inputted from a frame memory 150*j* while reference image data are inputted from another frame memory 150*g*, and block matching between the original image data and the reference image data is performed by a motion searcher 120. An optimum motion vector which has the highest correlation degree is extracted separately for a frame and a field from the original image data, and the optimum motion vectors thus extracted are inputted to a motion predictive discriminator 151. Thus, a single optimum motion vector is outputted from the motion predictive discriminator 151 to a subtractor 150*a* and an adder 150*f*. It is to be noted that the correlation degree is a degree of similarity.

In intra-picture coding, an MB is outputted from the frame memory 150*g* through a switch 150*b* to an encoder 150*c*, and quantization coefficients are calculated from the MB by a quantizer 150*h* in the encoder 150*c*. The coefficients are coded by a variable length encoder 150*i* and outputted as a stream of MPEG coded bits (MPEG stream). Further, the image data outputted from the encoder 150*c* are branched and then decoded by a decoder 150*d*, and the decoded picture data are inputted to and stored into the frame memory 150*g* through a switch 150*e*. Then, the image data for reference stored in the frame memory 150*g* are inputted to the motion predictive discriminator 151 and the motion searcher 120.

On the other hand, in inter-picture coding, an MB is outputted from the frame memory 150*j* and inputted through the subtractor 150*a* and the switch 150*b* to the encoder 150*c*, by which the MB is variable length coded similarly so that it is outputted as an MPEG stream. The output of the encoder 150*c* is decoded by the decoder 150*d*, and the decoded image data and the optimum motion vector are added by the adder 150*f*. Then, the image data obtained by the addition are stored into the frame memory 150*g* through the switch 150*e*. The thus stored image data for reference are inputted to the motion predictive discriminator 151 and the motion searcher 120.

In this manner, even where position information produced from difference information is added, the entire information amount as a result of the addition of the difference information to image data can be reduced. Further, sampling in the DCT described above may be made rough. Further, codes are applied to effective coefficients (values other than 0) after the quantization in response to an appearance pattern of them, and the magnitude of the information amount is adjusted by control principally of the magnitude of the quantization. It is to be noted that the roughness of sampling may sometimes be referred to as roughness of quantization.

By the way, since a motion vector is obtained by a parallel movement search of an MB, it is different depending upon the scene. Accordingly, although an appropriate motion vector is obtained from a parallel movement scene of a solid member or the like, no appropriate motion vector is present with regard to a scene of the surface of the water or a honeycomb, etc. which has a shape of small patterns, or with regard to a scene of rotation, enlargement, reduction or the like of a body. In this instance, random motion vectors which have different directions between different MBs sometimes appear. In addition, since a motion vector is coded with difference information from a motion vector of a preceding MB which is positioned in the picture, where random motion vectors appear, the information amount of motion vectors increases significantly.

Subsequently, a relationship between the compression ratio and the information amount of motion vectors is described. Taking a television signal as an example, an original signal has an information amount of one hundred and several tens Mbps, and compression of the signal reduces the information amount to 4 Mbps to 6 Mbps (to 1/20 to 1/30). Of the information amount, the information amount of the motion vector is several hundreds kbps to 1 Mbps, and where the compression ratio is such as just described, the information amount in DCT and motion compensation is allocated normally. Here, k (kilo) represents ten to the third power while M (mega) represents ten to the sixth power, and bps is a transmission ratio per one second.

On the other hand, if the compression ratio increases and the value of an MPEG stream becomes, for example, 2 Mbps to 3 Mbps, then even if DCT reduces the information amount regarding the quantization coefficients, the difference amounts regarding motion vectors (the motion vector information amount) cannot be allocated sufficiently to the MPEG stream.

Further, in low rate coding with a raised compression ratio, since the rate of occupation of the motion vector information amount in the entire coded information amount increases, the motion vector information amount cannot be ignored.

Therefore, a countermeasure for reducing the motion vector information amount is required. Systems and methods for decreasing the motion vector information amount are disclosed in Japanese Patent Laid-Open No. SHO 61-200789 (hereinafter referred to as first related art document), Japanese Patent Publication No. HEI 7-38722 (hereinafter referred to as second related art document), Japanese Patent Laid-Open No. HEI 8-79767 (hereinafter referred to as third related art document) and Japanese Patent Laid-Open No. HEI 11-215504 (hereinafter referred to as fourth related art document).

First, the scheme disclosed in the first related art document is directed to using motion vector detection results of surrounding blocks to perform correction processing for a motion vector obtained by a conventional method to obtain a motion vector corresponding to an actual movement of a body, and uses a common motion vector to that of an adjacent block. In particular, according to the scheme, a motion vector is assimilated with a vector of a surrounding block to reduce erroneous detection, and a motion vector of a block around an input block is used to correct a motion vector obtained by a motion vector detection section.

The scheme disclosed in the second related art document is directed to realization of a coding system which has a high motion compensation efficiency. In the scheme, a motion vector of a current block is calculated from a motion vector of an adjacent block. In particular, two motion vectors including a motion vector (vector 1) of a current block calculated using motion vector information of an adjacent block and another motion vector (vector 2) calculated actually by block matching are calculated individually, and resulting difference information is compared with each other. If it is discriminated that there is no difference in efficiency when the motion vector information of the vector 2 is added and a result of the addition is coded, then only the difference information is coded using the vector 1.

Consequently, since the vector 1 which is calculated from a vector of an adjacent block can be calculated similarly on the decoding side if the decoding side has the same calculation algorithm, coding of the motion vector is unnecessary.

Further, the scheme disclosed in the third related art document is directed to provision of a vector coding system and decoding system by which the information amount of moving picture data can be reduced, and uses the same motion vector as that of an adjacent block. Then, a motion vector component of the adjacent block and a vector component of a motion vector of the current block are compared with each other. If the motion vector of the current block can be considered to be equal to the motion vector of the adjacent block, then the blocks are regarded as a group and a single piece of vector information is coded for the group.

In addition, the scheme disclosed in the fourth related art document is directed to provision of a moving picture coding apparatus which can decrease the code amount in accordance with the magnitude of motion vectors and can thereby augment the coding efficiency. According to the scheme, a motion vector is determined actually from an inter-block difference amount, and if the distribution of such motion vectors exhibits a wide appearance range of motion vectors, then a variable length table with which a wide range can be represented is used, but if the distribution exhibits a narrow appearance range of motion vectors, then a variable length table with which a narrow range can be represented sufficiently is used. In particular, according to the scheme, when variable length coding of motion vectors is performed after ordinary detection of motion vectors is performed, a variable length table with which coding can be performed in a comparatively high efficiency is searched out and used to perform coding. Here, where the variable length table can represent over a wide range, the code lengths of individual codes are long, but where the variable length can represent over a narrow range, the code lengths of individual codes are short.

The systems and methods described above, however, have the following subjects to be solved.

Firstly, according to the schemes disclosed in the first to fourth related art documents, when the transmission rate is low, the amount of information bits regarding motion vectors increases relative to the total transmission amount. Also there is a subject to be solved that, while the difference amount can be decreased by quantization in which DCT is used, the information amount of motion vectors cannot be reduced.

Secondly, the schemes disclosed in the first, second and third related art documents have a subject to be solved in that the calculation amount is very great because correction calculation of motion vectors is performed after motion vectors of individual blocks are calculated.

Thirdly, the schemes individually have such various subjects to be solved as described below. In particular, the scheme of the first related art document has a subject to be solved in that the document does not describe decoding of motion vectors and the scheme is not superior in terms of the coding efficiency.

Meanwhile, the scheme disclosed in the second related art document has a subject to be solved in that, although the MPEG system prescribes for the encoder side, also the decoder side must use the same algorithm as that of the encoder side. Further, the second related art document is silent of a method for coding motion vector information or a method of reducing the information amount of such motion vector information.

In addition, the scheme disclosed in the third related art document has a subject to be solved that, since blocks are grouped, additional bits for indicating upward, rightward and downward directions are required in order to indicate of which one of adjacent blocks the motion vector is same as that of the pertaining block. Further, the third related art document is silent of a method of coding motion vector information or a method of reducing the information amount of the motion vector information.

Further, the scheme disclosed in the fourth related art document has a subject to be solved that the calculation amount is very great because correction calculation of motion vectors is performed after motion vectors of blocks are calculated.

SUMMARY OF THE INVENTION

It is an object of the present invention to provide a motion vector searcher and a motion vector search method as well as a moving picture coding apparatus by which, when the compression ratio is high and the transmission rate is low, the information amount of motion vectors can be reduced efficiently while the accuracy of the motion vectors is maintained.

In order to attain the object described above, according to the present invention, for the object of reduction of the information amount of motion vectors when the compression ratio is high and the transmission rate is low, an additional amount is added to a motion vector in block matching to perform correction calculation thereby to calculate a motion vector by one motion search while the magnitude of the additional amount is adjusted.

More particularly, according to an aspect of the present invention, there is provided a motion vector searcher for moving picture coding which calculates difference amounts between an original image macro block obtained by dividing original image data inputted thereto and a plurality of search macro blocks provided in reference image data to produce motion vectors representative of positions of the plurality of reference macro blocks from the same position as a position of the original image macro block, comprising a difference arithmetic operation section for calculating and outputting the difference amounts between the original image macro block and the plurality of search macro blocks, an additional amount arithmetic operation section connected to the difference arithmetic operation section for outputting a correction difference amount which is obtained by adding an additional amount, the additional amount which relies upon a horizontal component and a vertical component of each of the motion vectors and a state of coding, to each of the difference amounts outputted from the difference arithmetic operation section and for outputting a motion vector based on the motion vector or vectors of an adjacent one or ones of the search macro blocks and the corresponding correction difference amount or amounts, and a motion vector determination section connected to the additional amount arithmetic operation section for determining an optimum motion vector which exhibits the highest one of correlation degrees between the original image block and the search blocks.

The motion vector searcher is advantageous in that not only information generated by coding of difference information but also information generated by coding of motion vector information can be adjusted, and since generation of a redundant motion vector information amount can be suppressed particularly upon low rate coding wherein the magnitude of the motion vector information amount cannot be ignored, efficient coding can be achieved.

The difference arithmetic operation section may include a plurality of inter-block difference arithmetic operation sections for outputting differences between data regarding the search macro blocks and data regarding the original image block as the difference amounts. In this instance, the additional amount arithmetic operation section may include a plurality of additional amount arithmetic operation circuits individually connected to the plurality of inter-block difference arithmetic operation sections of the difference arithmetic operation section for outputting the correction difference amounts and outputting the motion vectors based on the correction difference amounts for motion vectors which are inputted from the outside.

Further, the additional amount arithmetic operation section may set the additional amount such that the additional amount includes a value which originates from variation amounts between the horizontal component and the vertical component of the motion vector and a horizontal component and a vertical component of a preceding motion vector produced in the past and increases as the variation amounts increase. As an alternative, the additional amount arithmetic operation section may set the additional amount such that the additional amount includes a value which originates from the horizontal component and the vertical component of the motion vector and increases as the horizontal component and the vertical component of the motion vector increase. As another alternative, the additional amount arithmetic operation section may set the additional amount such that the additional amount includes a value which originates from a coding bit rate at which moving picture coding is performed and increases as the coding bit rate decreases. As a further alternative, the additional amount arithmetic operation section may set the additional amount such that the additional amount includes a value which originates from the magnitude of a quantization coefficient of discrete cosine transform to be performed for each of the macro blocks and increases as the quantization coefficient increases.

Otherwise, the additional amount arithmetic operation section may set the additional amount such that the additional amount includes a value which originates from a motion vector information amount by which the motion vectors are generated and a total information amount by which coded data of a moving picture are generated and increases as a ratio of the motion vector information amount to the total information amount increases, or may set the additional amount such that the additional amount includes a value which originates from an activity value representative of complexity of image variation and increases as the activity value increases, or else may set the additional amount such that the additional amount includes a value which originates from at least one of an average value of directions indicated by motion vectors in the past and a variance with regard to the average value.

The additional amount arithmetic operation section may be capable of resetting the additional amount 0 for each coded picture which is a unit of image processing.

The motion vector searcher is advantageous in that, since calculation of motion vectors can be performed at a high speed, the search range of motion vectors can be expanded and it becomes possible to trace a body which exhibits much complicated movements, by which augmentation of the picture quality is achieved.

According to another aspect of the present invention, there is provided a motion vector search method for moving picture coding wherein difference amounts between an original image macro block obtained by dividing original image data inputted thereto and a plurality of search macro blocks provided in reference image data are calculated to produce motion vectors representative of positions of the plurality of reference macro blocks from the same position as a position of the original image macro block, comprising a difference arithmetic operation step of calculating differences between data regarding the plurality of search macro blocks and data regarding the original image macro block and outputting the differences as the plurality of difference amounts, an additional amount arithmetic operation step of adding additional amounts which rely upon horizontal components and vertical components of the plurality of motion vectors and a state of coding to the difference amounts, and a motion vector determination step of determining an optimum motion vector which has the minimum information amount from among the plurality of motion vectors.

The motion vector search method is advantageous in that the necessity for complicated calculation is eliminated and an additional amount can be adjusted and added to a motion vector and besides the information amount of motion vectors can be reduced while the accuracy of motion vectors is maintained.

According to a further aspect of the present invention, there is provided a moving picture coding apparatus for moving picture coding which calculates difference amounts between an original image macro block obtained by dividing original image data inputted thereto and a plurality of search macro blocks provided in reference image data to produce motion vectors representative of positions of the plurality of reference macro blocks from the same position as a position of the original image macro block, and performs motion compensation, comprising a difference arithmetic operation section for calculating and outputting the difference amounts between the original image macro block and the plurality of search macro blocks, an additional amount arithmetic operation section connected to said difference arithmetic operation section for outputting a correction difference amount which is obtained by adding an additional amount, the additional amount which relies upon a horizontal component and a vertical component of each of the motion vectors and a state of coding, to each of the difference amounts outputted from the difference arithmetic operation section and for outputting a motion vector based on the motion vector or vectors of an adjacent one or ones of the search macro blocks and the corresponding correction difference amount or amounts, and a motion vector determination section connected to the additional amount arithmetic operation section for determining an optimum motion vector which exhibits the highest one of correlation degrees between the original image block and the search blocks, the additional amount arithmetic operation section setting the additional amount for the original image macro block at a predetermined position of a coded picture which is a unit of information processing such that the magnitude of the additional amount is varied using motion vector information of the original image macro block at the same position as that of a preceding coded picture coded in the past, average motion vector information of the preceding coded picture and the motion vector information searched already from the coded picture.

The moving picture coding apparatus is advantageous in that the processing speed is augmented and the search range of original image pictures can be expanded, and consequently, smoother images can be obtained. Further, a body or an event which exhibits a high speed movement can be caught and the visibility is augmented significantly.

The above and other objects, features and advantages of the present invention will become apparent from the following description and the appended claims, taken in conjunction with the accompanying drawings.

BRIEF DESCRIPTION OF THE DRAWINGS

FIG. 13 is a table showing an example of coded data;

DESCRIPTION OF THE PREFERRED EMBODIMENTS

The embodiments of the present invention are hereinafter described with reference to the accompanying drawings.

A. Description of the First Embodiment of the Present Invention

Figure 1:
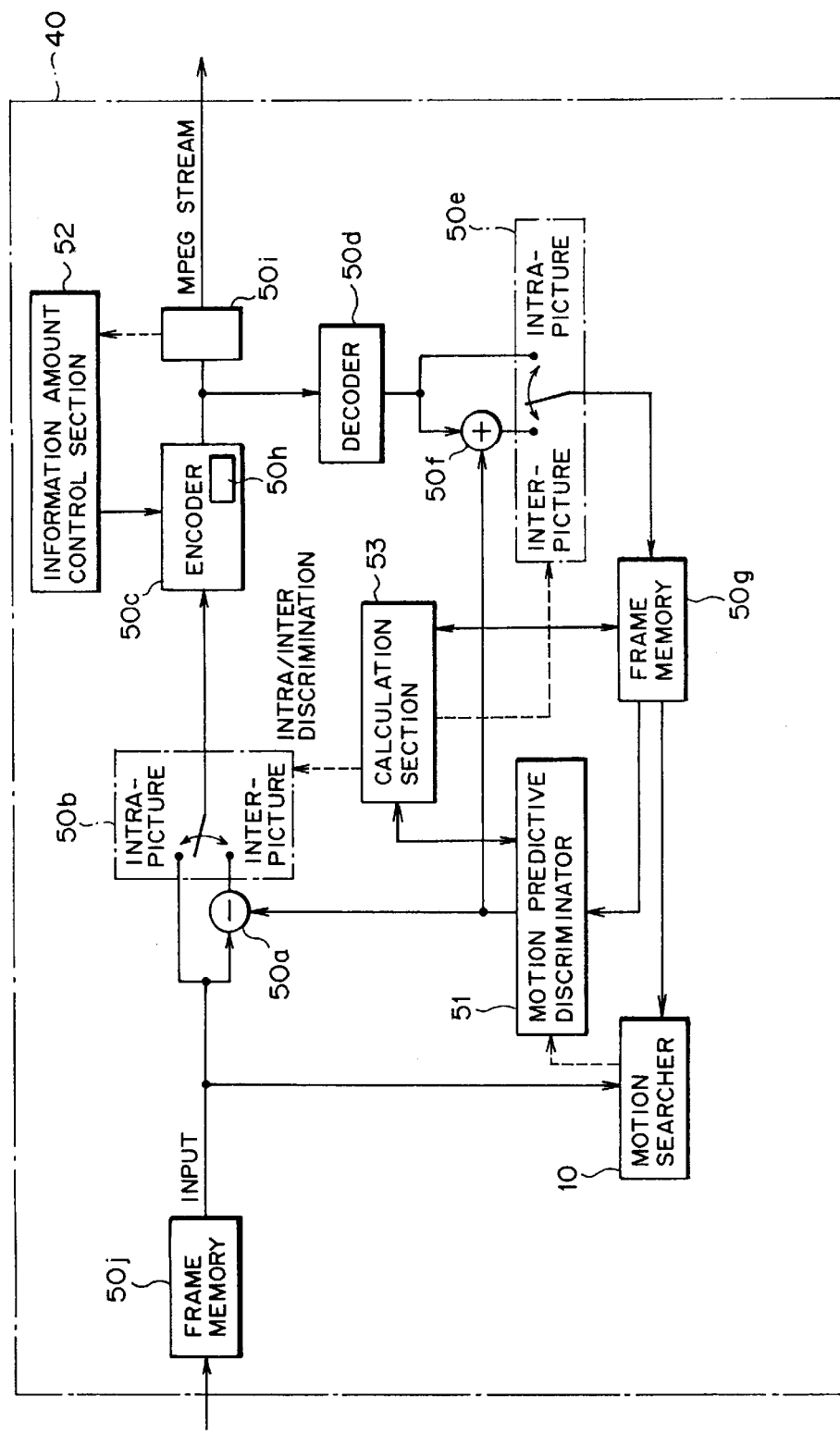
FIG. 1 is a block diagram of an MPEG coding apparatus according to a first embodiment of the present invention.

FIG. 1 is a block diagram of an MPEG coding apparatus (moving picture coding apparatus) according to a first embodiment of the present invention. Referring to FIG. 1, the MPEG coding apparatus 40 shown compresses original image MBs of 16×16 picture elements inputted thereto in a unit of an MB in accordance with the MPEG2 system and sends out the compressed data. The MPEG coding apparatus 40 includes a pair of frame memories 50j and 50g, a subtractor 50a, a pair of switches 50b and 50e, an encoder 50c, a decoder 50d, an adder 50f, a variable length encoder 50i, a motion predictive discriminator 51, an information amount control section 52, a calculation section 53, and a motion searcher 10.

The frame memory 50j stores and outputs original image data inputted thereto, and this function is exhibited by, for example, a RAM (Random Access Memory). The frame memory 50g stores and outputs image data of a frame of a preceding timing (preceding frame). The image data of the preceding frame are used as image data for reference, and the frame memory 50g stores and outputs image data outputted from the switch 50e. Also this function is realized by a RAM. The functions are exhibited as the same area of the RAMs is allocated using paging processing.

The subtractor 50a is connected to the frame memory 50j and the motion predictive discriminator 51 and subtracts motion vectors obtained from image data of the preceding frame inputted from the motion predictive discriminator 51 from an original image MB of 16×16 pixels inputted from the frame memory 50j. The switch 50b selectively outputs the original image MB or the image data inputted thereto from the subtractor 50a. The switch 50b is switched in accordance with a control signal from the calculation section 53 which is hereinafter described to switch whether an original image MB should be intra-picture coded or image data inputted from the subtractor 50a should be inter-picture coded.

The encoder 50c is connected to the switch 50b and compresses image data outputted from the switch 50b by DCT. The encoder 50c has a quantizer 50h for calculating a value of a quantization coefficient. The variable length encoder 50i allocates coefficients obtained by the quantizer 50h to codes in accordance with appearance patterns of them and outputs a compressed MPEG stream. The information amount control section 52 is connected to the variable length encoder 50i and the encoder 50c, and monitors the coding state of the variable length encoder 50i and controls the encoder 50c. Here, the information amount control section 52 controls the magnitude of a quantization coefficient to vary the compression radio. It is to be noted that the coding state signifies a roughness of quantization or a magnitude of a motion vector.

Image data outputted from the switch 50b are supplied to the quantizer 50h, by which values of quantization coefficients are calculated, and codes are allocated to the coefficients obtained by the quantizer 50h in accordance with an appearance pattern of the coefficients by the variable length encoder 50i. Then, the image data are compressed using DCT and an MPEG stream is outputted.

The data outputted from the encoder 50c are subject to internal processing called local decoding. First, in order to produce an image for reference, the decoder 50d decodes the coded data outputted from the encoder 50c and outputs image data obtained by the decoding. The adder 50f is connected to the decoder 50d and the motion predictive discriminator 51, and adds the decoded image data from the decoder 50d and a motion vector outputted from the motion predictive discriminator 51 and outputs image data obtained by the addition.

The switch 50e is connected to the decoder 50d and the adder 50f and selectively outputs decoded image data from the decoder 50d and image data of the preceding frame. The switch 50e is switched in accordance with a control signal from the calculation section 53 which is hereinafter described to switch so that decoded image data should be intra-picture coded or image data inputted from the adder 50f should be inter-picture coded. In addition, the switch 50e operates in an interlocking relationship with the switch 50b such that, when the switch 50b is switched to select intra-picture coding, also the switch 50e is switched to select intra-picture coding, but when the switch 50b is switched to select inter-picture coding, also the switch 50e is switched to select inter-picture coding.

The calculation section 53 is connected to the frame memory 50g, the switches 50b and 50e and the motion predictive discriminator 51, and recognizes contents of image data stored in the frame memory 50g, discriminates whether or not a picture has a frame structure or a field structure and inputs such discrimination information to the motion predictive discriminator 51, and further discriminates whether inter-picture coding should be performed or intra-picture coding should be performed and inputs switching control signals to the switches 50b and 50e. The calculation section 53 performs such discriminations as just described in a unit of an original image MB and calculates and uses an average value of pixel values of one original image MB and a variance value with regard to the average value.

Basically, for the first comparison between a search MB and an original picture MB positioned at the left upper corner in a search range, intra-picture coding is used, and thereafter, inter-picture coding is used. Also when re-scanning called refreshment is performed, intra-picture coding is performed.

The motion predictive discriminator 51 selectively outputs one of a motion vector for a frame and a motion vector for a field outputted from the motion searcher 10.

The motion searcher 10 calculates difference amounts between an original image MB obtained by dividing inputted original image data and a number of search MBs equal to the number of motion searches provided in reference image data to produce motion vectors representative of positions to the number of search MBs equal to the number of motion searches from the same position as that of the original image MB. Thus, the MPEG coding apparatus 40 functions as a motion vector searcher.

It is to be noted that, while the number equal to the number of motion searches in the following description is 256 as an example, it can be varied variously depending upon the search range. Then, the motion search section 10 performs difference calculation for 256 pixels for each search MB.

A motion vector for a frame and a motion vector for a frame are outputted from the motion searcher 10. The motion searcher 10 performs block matching between an original image MB inputted from the frame memory 50j and search MBs obtained by shifting the original image MB to various positions within the search range of the image data and held in the frame memory 50g.

Consequently, by the motion searcher 10, original image data inputted are divided to produce an original image MB, and differences between the original image MB and 256 search MBs obtained by shifting the original image MB within a search range provided in reference image data are calculated. Further, an optimum motion vector which has the highest correlation degree is extracted separately for a frame and a field from among the difference values, and the optimum motion vectors for a frame and a field are inputted to the motion predictive discriminator 51. The motion predictive discriminator 51 thus outputs an appropriate one of the optimum motion vectors for a frame and a field to the subtractor 50a and the adder 50f.

An image for reference is produced in accordance with the following flow of operations. First, when intra-picture coding is performed, an MB of 16×16 picture elements outputted from the frame memory 50j is supplied through the switch 50b to the encoder 50c, in which values of quantization coefficients are calculated by the quantizer 50h. To the quantization coefficients thus calculated, codes are allocated in accordance with an appearance pattern of the values of the quantization coefficients by the variable length encoder 50i, and the coded data are outputted as an MPEG stream.

Further, the image data outputted from the encoder 50c are decoded by the decoder 50d, and the thus decoded image data are inputted to and stored into the frame memory 50g through the switch 50e. The image data for reference stored in the frame memory 50g are inputted to the motion predictive discriminator 51 and the motion searcher 10.

On the other hand, when inter-picture coding is performed, an original image MB of 16×16 picture elements outputted from the frame memory 50j is supplied to the subtractor 50a, by which a motion vector obtained based on image data of a preceding frame is subtracted from the original image MB. Image data obtained by the subtraction are supplied through the switch 50b to the encoder 50c, in which values of quantization coefficients are calculated by the quantizer 50h. Further, codes are allocated to the quantization coefficients in accordance with an appearance pattern of the quantization coefficients to perform DCT compression by the variable length encoder 50i, and the coded data are outputted as an MPEG stream.

Similarly, in order to locally decode the image data from the encoder 50c and store the decoded image data as data for reference, after the image data from the encoder 50c are decoded by the decoder 50d, the decoded image data and an optimum motion vector are added by and outputted from the adder 50f, and the added image data are inputted to and stored into the frame memory 50g through the switch 50e. The image data for reference stored in the frame memory 50g are inputted to the motion predictive discriminator 51 and the motion searcher 10.

It is to be noted that, unless otherwise specified, the MPEG coding apparatus 40 shown in FIG. 1 has a similar construction also in any other embodiment or any modification which is hereinafter described.

Figure 2:
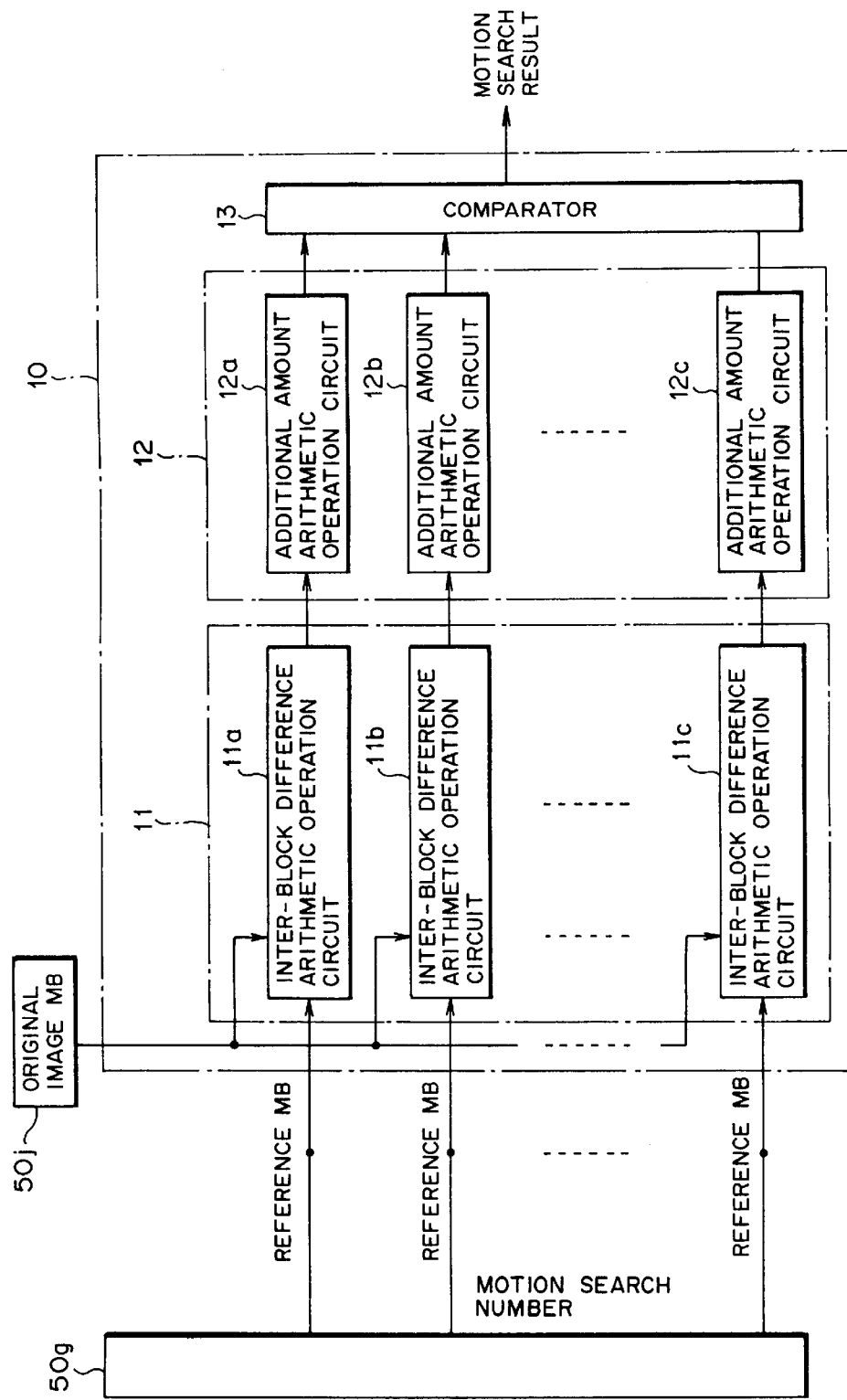
FIG. 2 is a block diagram of a motion searcher according to the first embodiment of the present invention.

FIG. 2 is a block diagram of the motion searcher 10 of the MPEG coding apparatus 40 according to the first embodiment of the present invention. Referring to FIG. 2, the motion searcher 10 includes a inter-block difference arithmetic operation section (difference arithmetic operation section) 11, an additional amount arithmetic operation section 12, and a comparator (motion vector decision section) 13.

The inter-block difference arithmetic operation section 11 calculates and outputs difference amounts between an original image MB and 256 search MBs and includes a plurality of inter-block difference arithmetic operation circuits 11a, 11b, . . . , 11c. The inter-block difference arithmetic operation circuits 11a, 11b, . . . , 11c individually calculate differences between data regarding 256 search MBs and data regarding an original image MB and output the differences as difference amounts. The number of such inter-block difference arithmetic operation circuits 11a, 11b, . . . , 11c is 256 equally to the number of motion searches.

The additional amount arithmetic operation section 12 is connected to the inter-block difference arithmetic operation section 11, and adds an additional amount which relies upon a horizontal component and a vertical component of a motion vector and a state of coding to each of the difference amounts to obtain correction difference amounts and outputs the thus obtained correction difference amounts. The additional amount arithmetic operation section 12 further outputs motion vectors based on the correction difference values of motion vectors of adjacent 256 search MBs. The additional amount arithmetic operation section 12 includes 256 additional amount arithmetic operation circuits 12a, 12b, . . . , 12c.

The additional amount arithmetic operation circuits 12a, 12b, . . . , 12c are connected to the 256 inter-block difference arithmetic operation circuits 11a, 11b, . . . , 11c of the inter-block difference arithmetic operation section 11, respectively, and output correction difference values. Further, the additional amount arithmetic operation circuits 12a, 12b, . . . , 12c output motion vectors based on the correction difference values of motion vectors inputted from the outside. The additional amount arithmetic operation section 12 forms each of the additional amounts such that it includes a horizontal component and a vertical component of a motion vector and a horizontal component and a vertical component of a preceding motion vector produced last (in the past) and the additional amount increases as the variation amount increases.

The additional amount includes not only a horizontal component and a vertical component of a preceding motion vector but also values originating from the components such as values obtained by multiplying the components by a constant. Further, the magnitude of the additional amount sometimes signifies a weight of the additional amount. Further, the additional amount is sometimes used to signify a correction amount. Further, they are used in similar significance.

The comparator 13 (refer to FIG. 2) is connected to the additional amount arithmetic operation section 12 and decides an optimum motion vector which exhibits the highest correlation degree between an original image MB and search MBs. Further, search MBs outputted from the frame memory 50g shown in FIG. 2 are time divided and individually inputted to the 256 inter-block difference arithmetic operation circuits 11a, 11b, . . . , 11c.

Accordingly, the MPEG coding apparatus (moving picture coding apparatus) 40 calculates difference amounts between an original image MB obtained by dividing original image data inputted thereto and 256 search MBs provided in reference image data and produces motion vectors representative of positions to the 256 search MBs from the same position as that of the original MB to perform motion compensation. Then, the additional amount arithmetic operation section 12 varies the magnitudes of additional amounts with regard to the original image MB at a predetermined position of a coded picture which is a unit of image processing using motion vector information of the original image MB at the same position of a preceding coded picture coded last (in the past), average motion vector information of the preceding coded picture and motion vector information searched already from the coded picture.

It is to be noted that, in FIG. 2, like reference characters to those in FIG. 1 denote like elements or elements having like functions and further overlapping description of them is omitted herein to avoid redundancy.

In the motion searcher 10 having the construction described above, the inter-block difference arithmetic operation circuit 11a receives an original image MB from the frame memory 50j and a search MB from the frame memory 50g and calculates and outputs a difference between them as a difference amount. The inter-block difference arithmetic operation circuit 11b outputs a difference amount between the original image MB same as that used by the inter-block difference arithmetic operation circuit 11a and a search MB at a position shifted by one MB distance from the search MB used by the inter-block difference arithmetic operation circuit 11a. Similarly, the 256th inter-block difference arithmetic operation circuit 11c outputs a difference amount between the original image MB same as that used by the inter-block difference arithmetic operation circuit 11a and a search MB shifted by a pertaining amount. Accordingly, values all different from one another are outputted from the inter-block difference arithmetic operation circuits 11a, 11b, ..., 11c.

Then, additional amounts are added to the difference amounts by the additional amount arithmetic operation circuits 12a, 12b, ..., 12c in the additional amount arithmetic operation section 12 to obtain correction difference amounts, which are outputted from the additional amount arithmetic operation circuits 12a, 12b, ..., 12c, and motion vectors are coded based on the correction difference amounts of adjacent ones of the MBs. Further, the comparator 13 determines an optimum motion vector which exhibits the highest correlation degree between the original image MB and the search MBs and inputs the optimum motion vector to the motion predictive, discriminator 51 (refer to FIG. 1).

Accordingly, the motion vector search method calculates difference amounts between an MB obtained by dividing inputted original image data and 256 search MBs provided in reference image data to produce motion vectors representative of positions to the 256 search MBs from the same position as that of the original image MB. Thus, differences between data regarding the 256 search MBs and data regarding the original image MB are calculated and outputted as the plurality of difference amounts first (a difference arithmetic operation step), and additional amounts which rely upon horizontal components and vertical components of the plurality of motion vectors and a state of coding are added to the difference amounts (an additional amount arithmetic operation step), and then, an optimum motion vector which has the minimum information amount is determined from among the plurality of motion vectors (a motion vector determination step).

In this manner, the magnitudes of all of 256 motion vector information amounts can be adjusted. Further, where a plurality of search MBs which exhibit little difference absolute value sum are present, that search MB which minimizes the motion vector information amount may be selected as a motion search block.

Further, the additional amounts may be set based on some other values.

Figure 3:
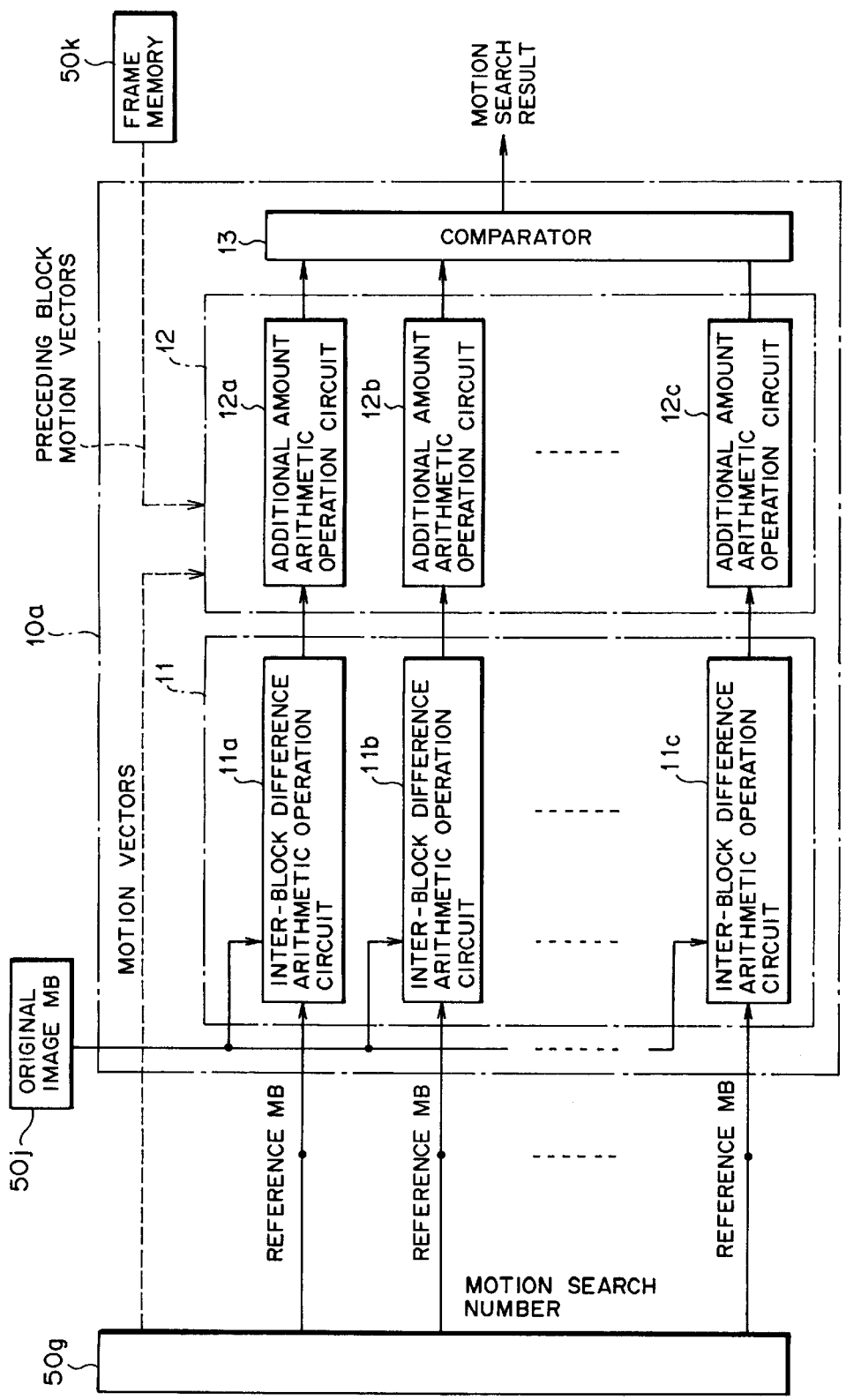
FIG. 3 is a block diagram of another motion searcher according to the first embodiment of the present invention.

FIG. 3 is a block diagram of another motion searcher 10a according to the first embodiment of the present invention. The motion searcher 10a shown in FIG. 3 decides an additional amount based on the magnitude of a variation amount of a motion vector component. A frame memory 50k (frame memory denoted by 50k) shown in FIG. 3 is similar to the frame memories 50j and 50g and can store data regarding motion vectors. The function just mentioned of the frame memory 50k is realized by a RAM. Those of the other elements shown in FIG. 3 which have like reference characters to those of FIG. 2 applied thereto denote like elements or elements having like functions.

Now, an example of setting of an additional amount is described. Where a motion vector Vn at an nth (n is an integer) search point determined by a motion search of a certain original image MB is represented by Vn=(vnx, vny) and a preceding motion vector PV determined by a motion search of the last search MB is represented by PV=(pvx, pvy), an additional amount Addn of a block difference amount is obtained in accordance with the following expression (3):

$$Addn = \alpha \cdot (|vnx-pvx| + |vny-pvy|) \qquad (3)$$

where $\alpha$ is a constant, and | | represents an arithmetic operation for obtaining an absolute value.

Accordingly, the additional amount is set such that it increases as a variation from the last block motion vector increases, and the motion vector is coded with a correction difference amount corrected with the last motion vector of a search MB positioned on the left side in the picture.

Consequently, if a screen which includes a flat portion which exhibits little variation of an image like a scene of the blue sky and repetitive patterns in a mixed state includes a large number of locations in which the inter-block difference has substantially equal values, then it is possible in a motion search of the screen to adjust a motion vector of a current original image MB to that of the last original image MB thereby to suppress the information amount of motion vectors.

In the MPEG coding apparatus 40 including the motion searcher 10a having the construction described above, the encoder 50c (refer to FIG. 1) performs DCT, quantization and variable length coding, and the decoder 50d performs dequantization and inverse DCT processing of data quantized by the encoder 50c.

In order to perform intra-picture coding, a search range is provided in a reference image, and an original image MB and a search MB which is positioned at the left upper corner of the search range are intra-picture coded at a first timing 1. At a next timing 2, the search MB is shifted by one search MB distance in a horizontal direction from the left upper corner, and block matching with the same original image MB is performed and a motion vector is calculated. To the motion vector, an amount which increases as a variation of the motion vector from the preceding block motion vector increases is added as an additional amount, and the resulting motion vector is stored into the frame memory 50k. Meanwhile, the inputted image data are coded and outputted as an MPEG stream.

Further, at a timing 3, the search MB is shifted by one search MB distance in the horizontal direction and block matching is performed, and then a motion vector is calculated and stored into the frame memory 50k. Meanwhile, the motion vector calculated at the timing 2 is coded together with the inputted image data and outputted as an MPEG stream.

Similarly, the search MB is successively shifted one by one search MB distance horizontally and vertically within the range of −16 to +15, and a motion vector is calculated for each search MB and stored into the frame memory 50k. Further, a motion vector at the last timing is read out from the frame memory 50k and coded together with the inputted image data and then outputted as an MPEG stream. It is to be noted that the search range is a mere example and is not limited to the specific one described above.

Accordingly, since a value which corresponds to a code amount generated upon coding is added as an additional amount to inter-frame block difference information as a motion vector, an increase in arithmetic operation amount in motion vector calculation is prevented, and the motion vector information amount can be reduced while the accuracy of motion vectors is maintained. Further, since the motion searcher 10 can be constructed taking the balance between motion vector information and coefficient information into consideration, efficient coding can be achieved.

Since additional amounts are added to motion vectors in the stage of a motion search in this manner, calculation of motion vectors can be performed by a single calculation operation, and complicated calculation is not required.

Further, an additional amount with the magnitude thereof adjusted can be added to a motion vector in this manner, and consequently, the information amount of motion vectors can be reduced while the accuracy of the motion vectors is maintained.

Furthermore, the process of performing correction processing of motion vectors after the motion vectors are calculated is eliminated, and consequently, the processing speed is augmented. Accordingly, in MPEG2 processing, the search range of an original image picture can be expanded.

As a result, an object body which moves swiftly can be caught, and this makes a motion of the screen smoother and augments the visibility significantly.

Further, all of applications which are applied to a moving picture of a high picture quality or an acoustic signal of a high sound quality and are used in the three fields of computers, broadcasting and communication are satisfied.

A1. Description of the First Modification to the First Embodiment of the Present Invention Another value can be used as an additional amount.

Figure 4:
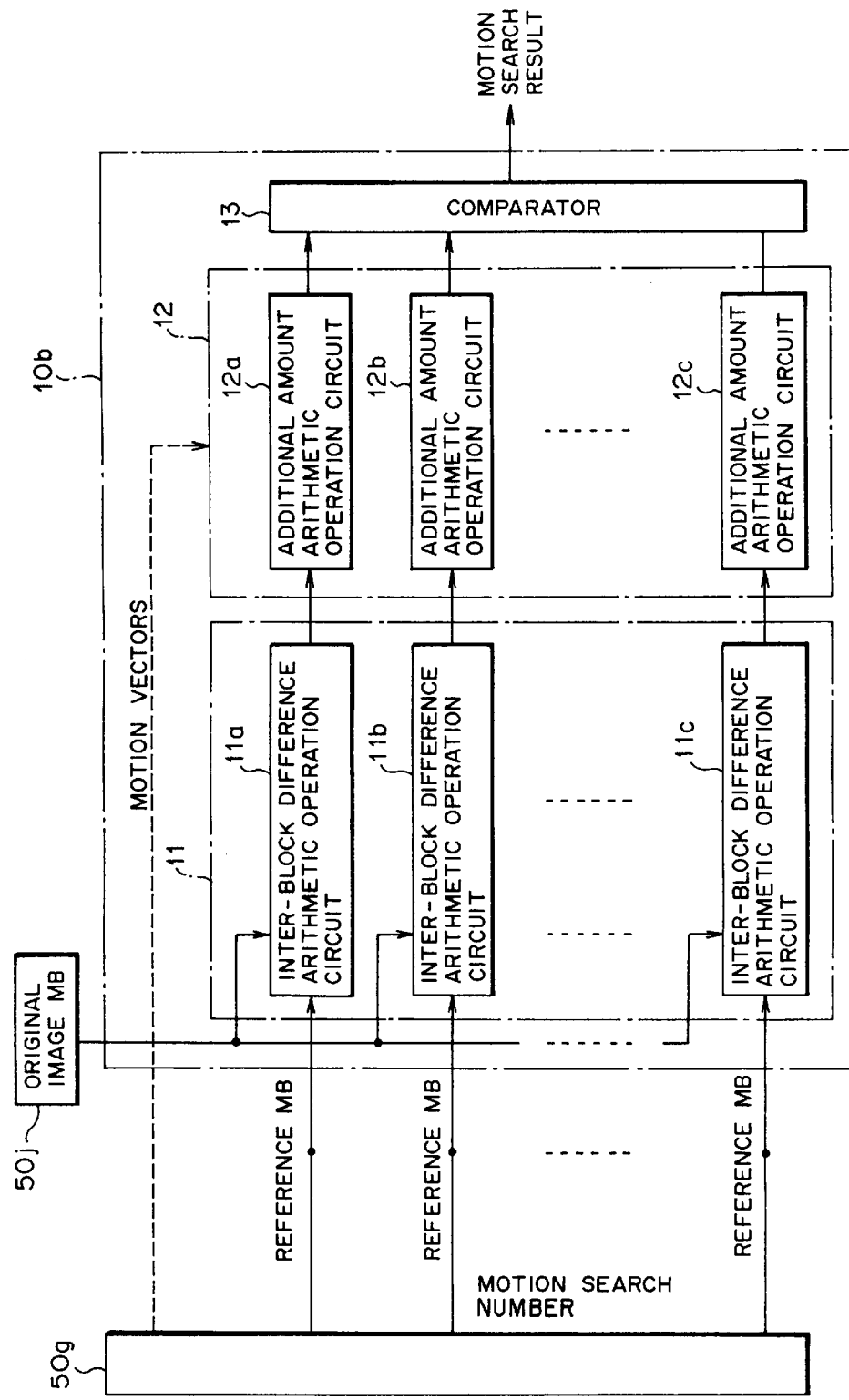
FIG. 4 is a block diagram of a motion searcher according to a first modification to the first embodiment of the present invention.

FIG. 4 is a block diagram of a motion searcher 10b according to a first modification to the first embodiment of the present invention. The motion searcher 10b shown in FIG. 4 uses a value determined from the magnitude of a motion vector component as an additional amount for correction.

Also in the present modification, MPEG2 coding is performed by the MPEG coding apparatus 40 (refer to FIG. 1). It is to be noted that overlapping description of the MPEG coding apparatus 40 is omitted herein.

The additional amount arithmetic operation section 12 shown in FIG. 4 calculates an additional amount such that it includes a value originating from a horizontal component and a vertical component of a motion vector and increases as the horizontal component and the vertical component of the motion vector increase in magnitude.

Where the additional amount of a block difference amount in a motion search in which a motion vector Vn at an nth (n is an integer) search point is calculated is represented by Addn, the additional amount Addn is determined in accordance with the following expression (4):

$$Addn = \beta \cdot (|vnx| + |vny|) \quad (4)$$

where $\beta$ is a constant, and vnx and vny are components (vnx, vny) of the motion vector Vn.

Accordingly, since a motion search is performed after an additional amount is determined using the magnitudes of components of a motion vector, a scene of the surface of the water which has a shape of small waves or a scene in which vectors having random motions are generated such as sand noise (noise called sand storm appearing on a television screen after broadcasting ends) can be displayed effectively. In particular, since it is difficult to adjust all of motion vectors of a current original image MB to a motion vector of the last original image MB, the magnitudes of the motion vectors themselves can be reduced with the additional amount to suppress the information amount.

It is to be noted that, as the addition processing, a method of determining a random property of a motion vector by calculation of a variance value can be used, and the addition processing is effective particularly where the variance value has a high value.

In the motion searcher 10b having the construction described above, when a single picture is used to perform coding, the intra-picture coding is selected, but when prediction coding is to be performed, a search range is provided in a reference image.

Initially, at a first timing 1, intra-picture coding is performed with an original image MB and a search MB at the left upper corner, and at a next timing 2, the search MB is shifted by one search MB distance in a horizontal direction from the left upper corner, and block matching between the search MB after shifted and the same original image MB is performed and a motion vector is calculated. The motion vector is determined with the magnitudes of components of the motion vector as an additional amount, and the motion vector is stored into the frame memory 50k. Further, the inputted image data are coded and outputted as an MPEG stream.

At a further timing 3, the search MB is further shifted by one search MB distance in the horizontal direction and block matching is performed, and then a motion vector is calculated and stored into the frame memory 50k. Meanwhile, the motion vector calculated at the timing 2 is coded together with the inputted image data and outputted as an MPEG stream.

Similarly, the search MB is successively shifted one by one search MB distance horizontally and vertically within the range of −16 to +15, and a motion vector is calculated for each search MB and stored into the frame memory 50k. Meanwhile, inputted image data are coded together with a motion vector at the preceding timing read out from the frame memory 50k and outputted as an MPEG stream.

Since additional amounts are added to motion vectors in the stage of a motion search in this manner, calculation of motion vectors can be performed by a single calculation operation and complicated calculation is unnecessary.

Further, the magnitudes of additional amounts can be adjusted and added to motion vectors. Consequently, the information amount of motion vectors can be reduced while the accuracy of the motion vectors is maintained.

Furthermore, the process of performing correction processing of motion vectors after the motion vectors are calculated is eliminated, and consequently, the processing speed is augmented. Accordingly, in MPEG2 processing, the search range of an original picture can be expanded.

As a result, an object body which moves swiftly can be caught, and this makes a motion of the screen smoother and augments the visibility significantly.

B. Description of the Second Embodiment of the Present Invention

Figure 5:
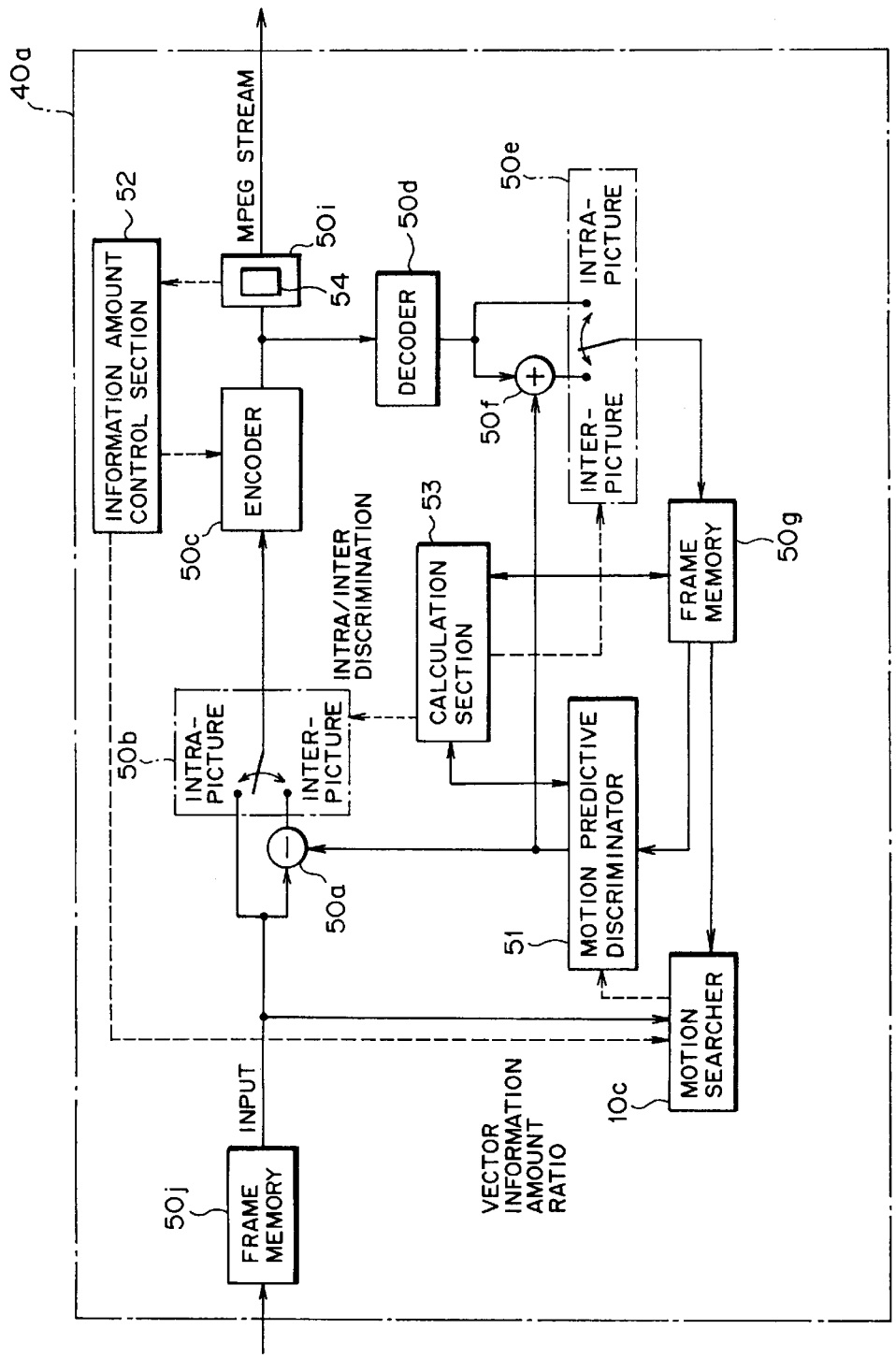
FIG. 5 is a block diagram of an MPEG coding apparatus according to a second embodiment of the present invention.

Also it is possible to vary the information amount of motion vectors when the compression ratio is high. FIG. 5 is a block diagram of an MPEG coding apparatus according to a second embodiment of the present invention. The MPEG coding apparatus 40a shown in FIG. 5 compresses original image MBs of 16×16 picture elements inputted thereto in a unit of an MB in accordance with the MPEG2 system and sends out the compressed original images similarly to the MPEG coding apparatus 40 described hereinabove with reference to FIG. 1.

The MPEG coding apparatus 40a shown in FIG. 5 is a modification to and has common components to those of the MPEG coding apparatus 40 of FIG. 1, but is different only in that the variable length encoder 50i in the MPEG coding apparatus 40a includes a counting circuit 54 and that the information amount control section 52 inputs a value (vector information amount ratio) regarding a coded bit rate to a motion searcher 10c. The counting circuit 54 counts coded bits of an MPEG stream, and this function is realized by, for example, a counter. The thus counted bit number is inputted as a vector information amount ratio to the motion searcher 10c through the information amount control section 52. It is to be noted that, in FIG. 5, like reference characters to those described hereinabove denote like elements or elements having like functions and further overlapping description of them is omitted herein to avoid redundancy.

Figure 6:
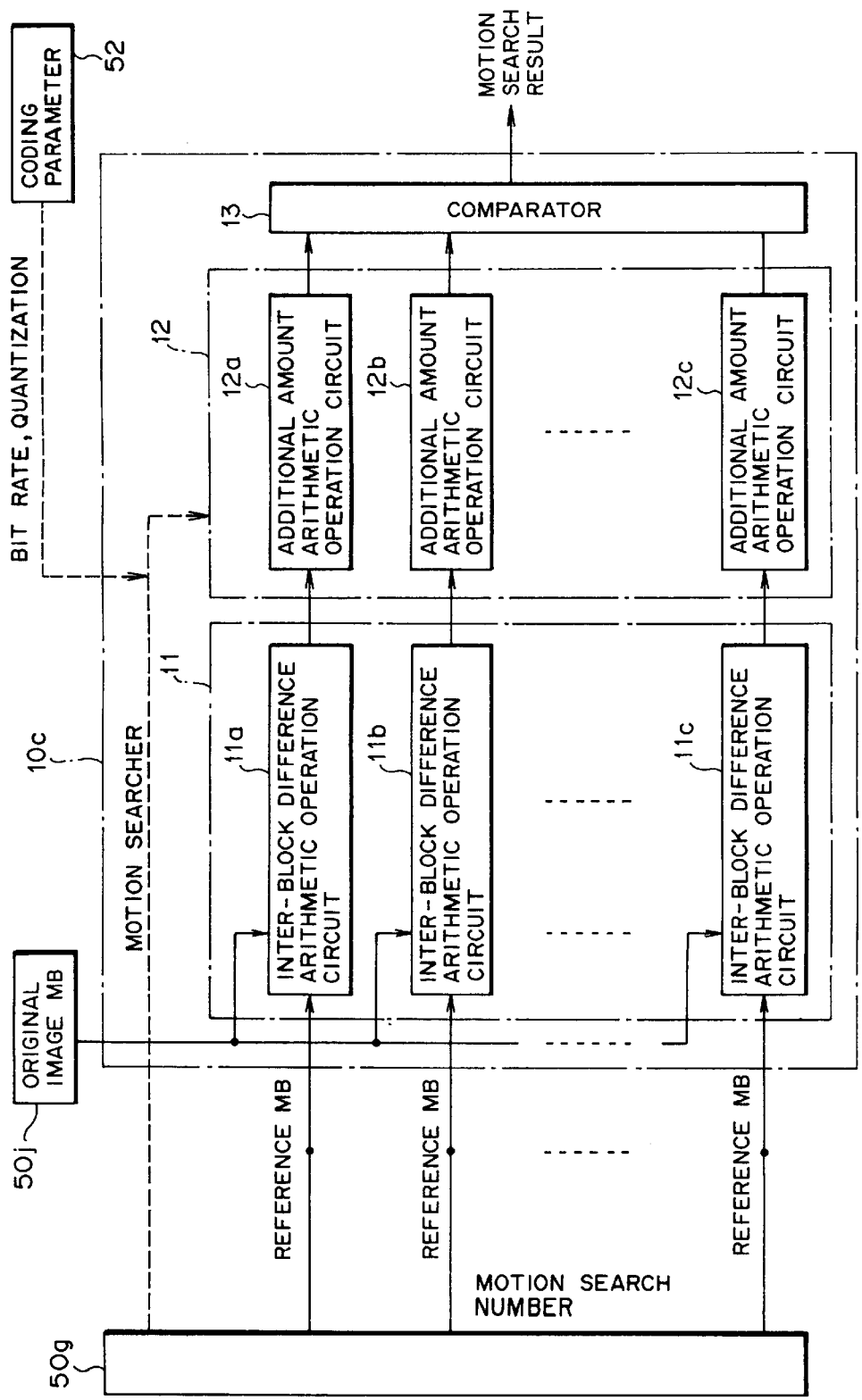
FIG. 6 is a block diagram of a motion searcher according to the second embodiment of the present invention.

FIG. 6 is a block diagram of the motion searcher according to the second embodiment of the present invention. The motion searcher 10c shown in FIG. 6 is similar to the motion searcher 10 (refer to FIG. 1) and calculates difference amounts between an original image MB and, for example, 256 search MBs to produce motion vectors. Further, the motion searcher 10c is connected to the information amount control section (coding parameters) 52 so that a vector information amount ratio regarding a coding bit rate is inputted from the information amount control section 52 to the motion searcher 10c. The information amount control section 52 thus controls so that, as the ratio of the motion vector information amount to the total information amount increases, the additional amount increases.

Accordingly, the additional amount arithmetic operation section 12 is constructed such that the additional amount includes a value which originates from a motion vector information amount by which the motion vectors are generated and a total information amount by which coded data of a moving picture are generated and increases as the ratio of the motion vector information amount to the total information amount increases.

Here, since the generation information amount of motion vectors cannot be obtained by an ordinary coding routine, the counting circuit 54 of the variable length encoder 50i (refer to FIG. 5) counts the number of bits of an MPEG stream, and control is performed based on the count value of the counting circuit 54.

More particularly, when coding is performed, the additional amount arithmetic operation section 12 measures a generation information amount of motion vectors (motion vector generation information amount $Info_{vec}$) and a total generation information amount (picture generation information amount $Info_{pic}$) and varies the additional amount using the ratio of the motion vector generation information amount $Info_{vec}$ to the picture generation information amount $Info_{pic}$.

It is to be noted that, in FIG. 6, like reference characters to those described hereinabove denote like elements or elements having like functions and further overlapping description of them is omitted herein to avoid redundancy.

Figure 7:
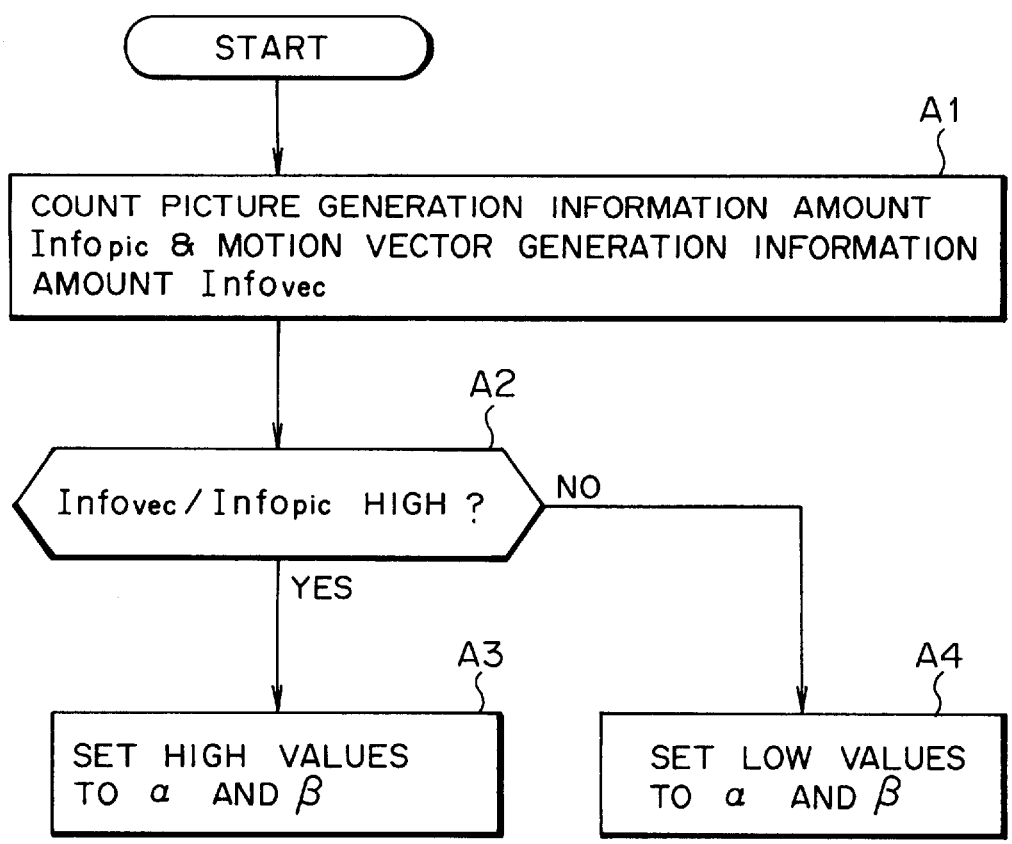
FIG. 7 is a flowchart illustrating an additional amount changing process according to the second embodiment of the present invention.

Now, a method of changing the magnitude of the additional amount of a motion vector is described with reference to FIG. 7. FIG. 7 is a flowchart illustrating an additional amount changing process according to the second embodiment of the present invention. First, a picture generation information amount $Info_{pic}$ and a motion vector generation information amount $Info_{vec}$ are measured (step A1), and it is discriminated whether or not the ratio between them (motion vector generation information amount $Info_{vec}$/picture generation information amount $Info_{pic}$) is higher than a predetermined value (step A2). Here, if the ratio is higher than the predetermined value, then the processing follows the Yes route of step A2, and the constants α and β are set to high values (step A3). If the ratio is not higher than the predetermined value, then the processing follows the No route of step A2, and α and β are set to low values (step A4).

Then, the additional amount arithmetic operation section 12 sets the additional amount Addn to a value represented by an additional amount calculation expression for a motion vector search given by the following expression (5) or (6):

$$Addn = \alpha \cdot (|vnx - pvx| + |vny - pvy|) \quad (5)$$

$$Addn = \beta \cdot (|vnx| + |vny|) \quad (6)$$

where vnx and vny are an X component and a Y component of a motion vector Vn at an nth search point, respectively, pvx and pvy are an X component and a Y component of a motion vector PV determined by a motion search prior by 1 MB (macro block), respectively, α and β are constants, and | | represents an arithmetic operation for obtaining an absolute value.

Consequently, when the coding bit rate is low, the motion vector information amount can be reduced. In particular, when the coding compression ratio becomes high, the quantization is roughened and the information amount of quantization coefficients is reduced. Consequently, even if the ratio of the motion vector information amount to the total coded information amount increases, useless or redundant information is removed by decreasing the motion vector information amount to the utmost.

Further, the values of the constants α and β are changed in response to the coding bit rate or the average quantization number of the picture. In this instance, the additional amount is set so as to have a value which increases in inverse proportion to the magnitudes of α and β or the additional amount bit rate and increases in proportion to the magnitude of quantization.

In the motion searcher 10c having the construction described above, in inter-picture coding, a search range is provided in a reference image for each of original image MBs obtained by dividing inputted image data, and after the search MB is shifted by one search MB distance in a horizontal direction and a vertical direction from the left upper corner, block matching with the MB same as the inputted original image MB is performed and a motion vector is calculated.

The motion vector is set based on an additional amount determined from the (motion vector generation information amount $Info_{vec}$/picture generation information amount $Info_{pic}$), and the motion vector thus set is stored into the frame memory 50k. Then, a motion vector is calculated for each of the search MBs successively shifted by one search MB distance and is stored into the frame memory 50k. Meanwhile, the inputted image data are coded with a motion vector at the preceding timing read out from the frame memory 50k and are outputted as an MPEG stream.

The two additional amount calculation expressions (5) and (6) given hereinabove can be adaptively and switchably used. In this instance, variances of horizontal components and vertical components of motion vectors are calculated to selection one of the additional amount calculation expressions.

Figure 8:
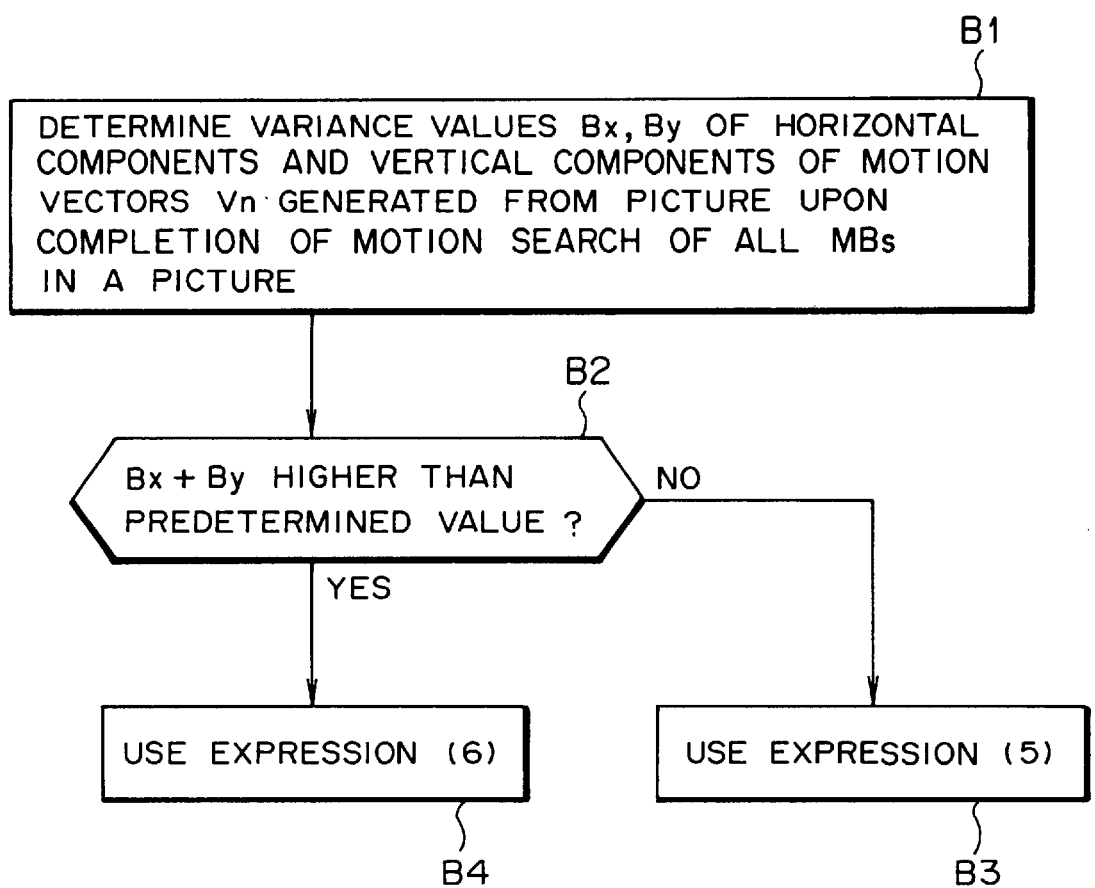
FIG. 8 is a flowchart illustrating an example of selection of an additional amount calculation expression according to the second embodiment of the present invention.

FIG. 8 is a flowchart illustrating an example of selection of an additional amount calculation expression in the second embodiment of the present invention. First, when a motion search for all search MBs of a picture is completed, variance values Bx and By of the horizontal component and the vertical component are calculated for the motion vectors generated in the picture (step B1). Then, a sum of them Bx+By is calculated and it is discriminated whether or not the sum value is higher than a predetermined value (step B2). If the sum Bx+By is higher than the predetermined value, then the processing follows the Yes route of step B2, and calculation of the expression (6) is performed (step B4). On the other hand, if the sum Bx+By is not higher than the predetermined value, then the processing follows the No route of step S2, and calculation of the expression (5) is performed (step B3).

Since the additional amount calculation expression to be used is adaptively switched to calculate an additional amount, fine control can be anticipated.

Further, since additional amounts are added to motion vectors in the stage of a motion search similarly as in the first embodiment, complicated calculation is not required.

Furthermore, the magnitude of the additional amount can be adjusted in this manner, and consequently, the information amount of motion vectors can be reduced while the accuracy of the motion vectors is maintained.

Besides, since the processing speed can be augmented as a result of the simplification of the correction processing in this manner, the search range of an original image picture can be expanded. Accordingly, an object body which moves swiftly can be caught, and this makes a motion of the screen smoother and augments the visibility significantly.

B1. Description of the First Modification to the Second Embodiment of the Present Invention Where the compression ratio is high, the additional amount can be varied even if the variable length encoder 50*i* does not include the counting circuit 54.

Figure 9:
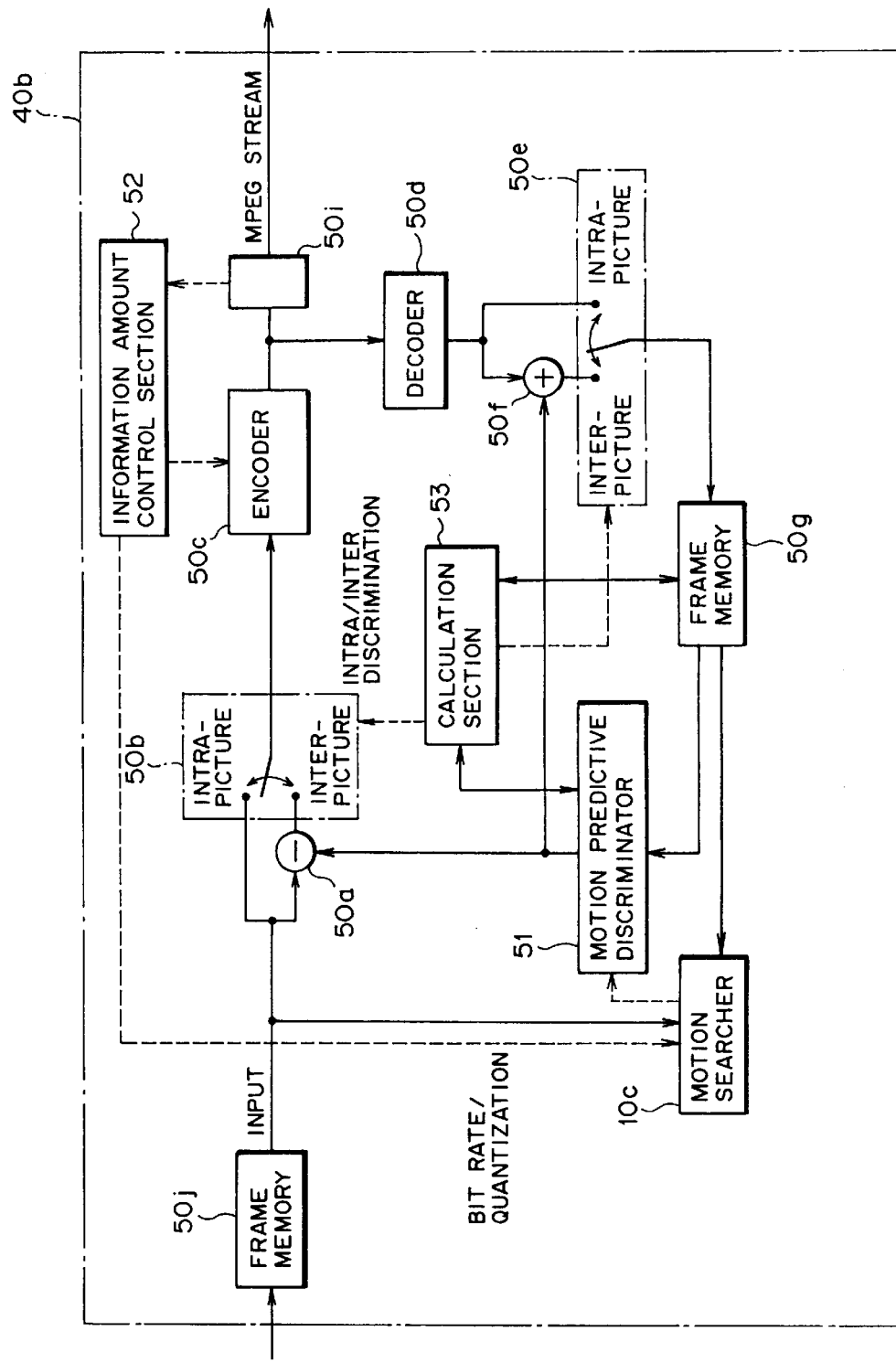
FIG. 9 is a block diagram of an MPEG coding apparatus according to a first modification to the second embodiment of the present invention.

FIG. 9 is a block diagram of an MPEG coding apparatus 40*b* according to a first modification to the second embodiment of the present invention. The information amount control section 52 of the modified MPEG coding apparatus 40*b* shown in FIG. 9 inputs, as information regarding the coding bit rate, a bit rate or quantization information (a quantization coefficient) to the motion searcher 10*c*.

The MPEG coding apparatus 40*b* makes use of the fact that, when the ratio of the generation information amount of motion vectors to the total generation information amount is high, the coding bit rate is low. In other words, the magnitude of the additional amount is varied in response to the magnitude of an aimed bit rate (target bit rate).

For the target bit rate, a bit rate value higher than an information amount that the GOP has or a bit rate value of the picture may be used, or a small unit such as a slice (which signifies scanning of an original image along a line in a horizontal direction) rate or the rate for each MB may be used.

Accordingly, the additional amount arithmetic operation section 12 is constructed such that the additional amount includes a value which originates from a coding bit rate at which coding of a moving picture is performed and increases as the coding bit rate decreases.

In the MPEG coding apparatus 40*b* having the construction described above, in inter-picture coding, the search MB is shifted by one search MB distance in a horizontal direction and a vertical direction from the left upper corner within a search range, and block matching with an original picture MB is performed and a motion vector is calculated.

The additional amount to be added to the motion vector is controlled so that, as the target bit rate decreases, the weight of the additional amount increases, and as the coding bit rate decreases, the additional amount increases.

Then, for each original image MB, motion vectors are calculated and stored into the frame memory 50*k*. Meanwhile, the inputted image data are coded with a motion vector at the preceding timing read out from the frame memory 50*k* and are outputted as an MPEG stream.

Since the ratio of the motion vector generation information amount to the total generation information amount is calculated in this manner, the magnitude of the additional amount can be reflected with a higher efficiency.

As another form, the magnitude of quantization can be used. In particular, unless special image data are inputted, the coding bit rate and the magnitude of quantization are controlled so as to vary in an interlocking relationship with each other such that, when the coding bit rate decreases, the value of quantization increases, the value of quantization may be used in place of the coding bit rate to vary the magnitude of the additional amount. In particular, the additional amount arithmetic operation section 12 sets the additional amount such that it includes a value which originates from the magnitude of a quantization coefficient of DCT performed for each original image MB and, as the quantization coefficient increases, the additional amount increases.

In the MPEG coding apparatus 40*b* having the construction described above, where inter-picture coding is performed, the additional amount is controlled so that it increases as the value of quantization increases but decreases as the value of quantization decreases.

Where the coding bit rate or the value of quantization is used in this manner, such advantages as described hereinabove in connection with the second embodiment are achieved. Besides, since the generation information amount of motion vectors is obtained without provision of a counter circuit in the variable length encoder 50*i*, calculation of the additional amount can be performed with a higher efficiency.

B2. Description of the Second Modification to the Second Embodiment of the Present Invention A function of resetting the additional amount may be additionally provided to the motion searcher 10*c* in the second embodiment.

Figure 10:
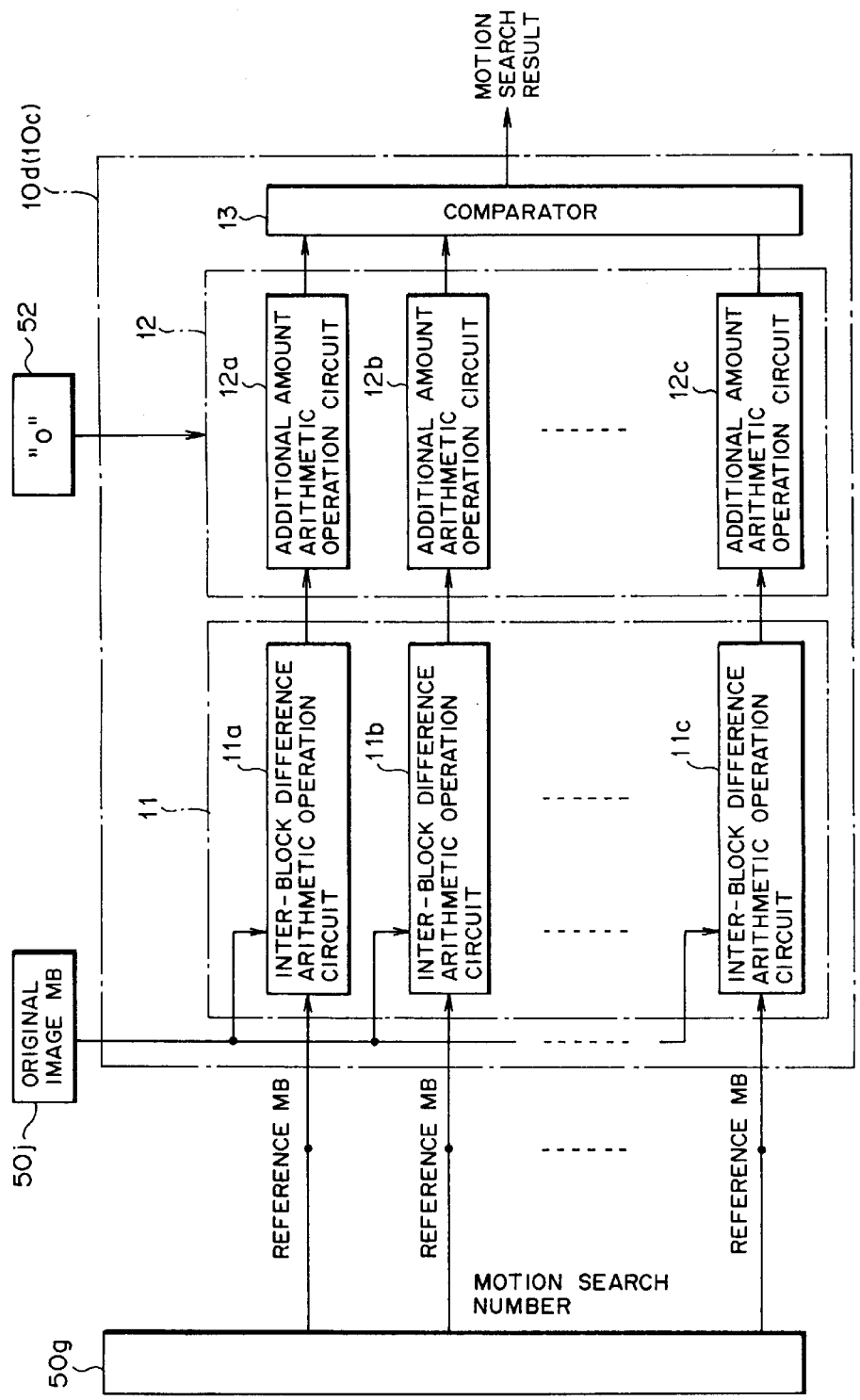
FIG. 10 is a block diagram of a motion searcher of an MPEG coding apparatus according to a second modification to the second embodiment of the present invention.

FIG. 10 is a block diagram of a motion searcher 10*d* according to a second modification to the second embodiment of the present invention. The motion searcher 10*d* shown in FIG. 10 is connected to the information amount control section 52 and can compulsorily reset the additional amount to zero. It is to be noted that, in FIG. 10, like reference characters to those described hereinabove with reference to FIG. 6 denote like elements or elements having like functions and further overlapping description of them is omitted herein to avoid redundancy.

Also in the motion searcher 10*d* according to the second modification to the second embodiment, inter-picture coding is performed similarly as in the second embodiment.

Since the zero resetting function is additionally provided in this manner, the state wherein no additional amount is added can be regenerated readily, and a motion vector search based only on inter-block differences can be performed.

Further, for example, when the ratio of the generation information amount of motion vectors is so low that it has no influence upon the other elements, a motion vector at a position at which the lowest value is exhibited among the inter-frame block difference amounts in a motion search can be used to perform coding.

C. Description of the Third Embodiment of the Present Invention

Figure 11:
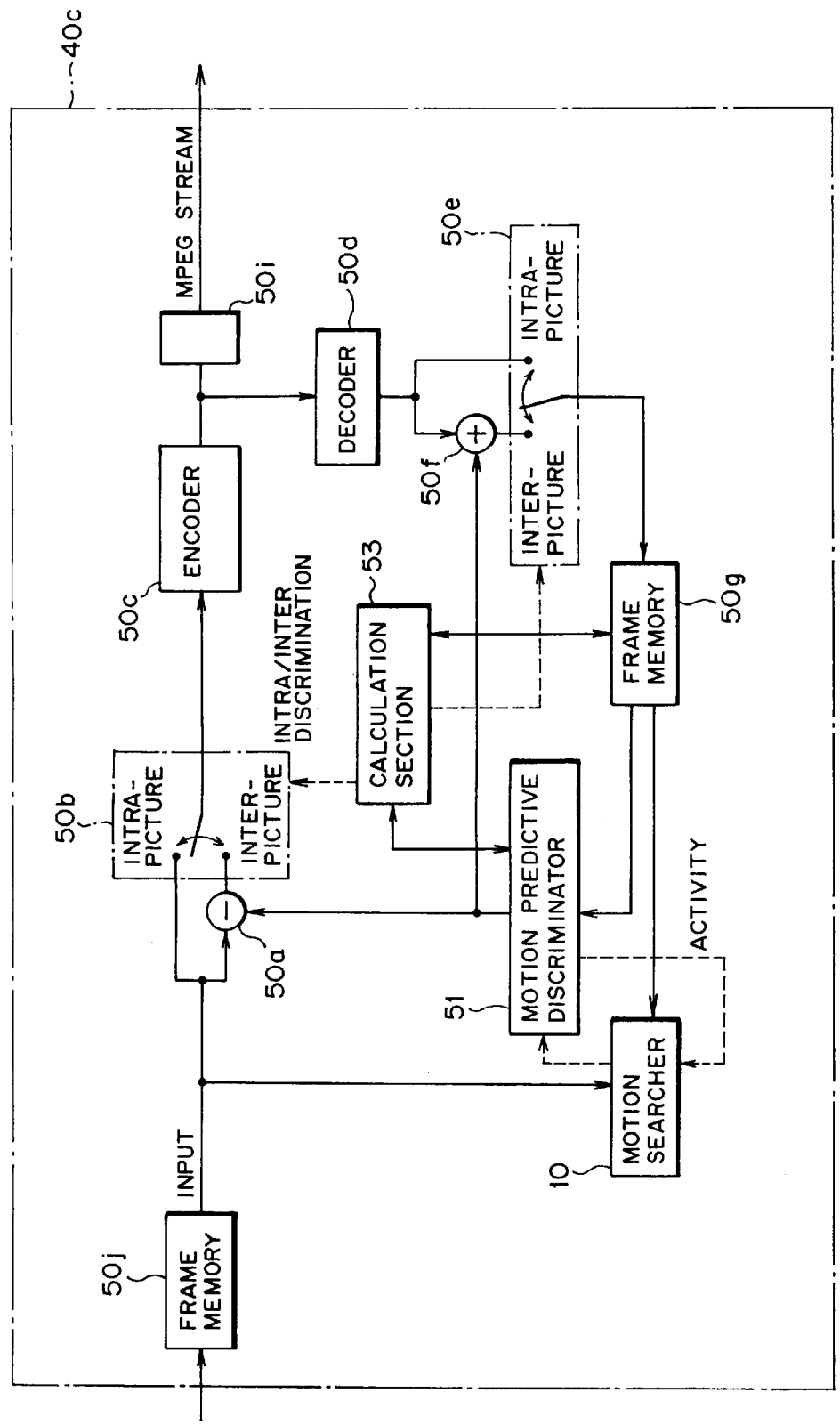
FIG. 11 is a block diagram of an MPEG coding apparatus according to a third embodiment of the present invention.

FIG. 11 is a block diagram of a MPEG coding apparatus 40*c* according to a third embodiment of the present invention. The MPEG coding apparatus 40*c* shown in FIG. 11 compresses original images MB of 16×16 picture elements inputted thereto in a unit of an MB in accordance with the MPEG2 system and sends out the compressed original image MBs similarly to the MPEG coding apparatus 40 (refer to FIG. 1). It is to be noted that, in FIG. 11, like reference characters to those described hereinabove with reference to FIG. 1 denote like elements or elements having like functions and further overlapping description of them is omitted herein to avoid redundancy.

The MPEG coding apparatus 40c varies the magnitude (weight) of the additional amount using an activity (activity value) of a picture or an MB (macro block) to be coded. The activity signifies complexity of the screen, and, for example, where a flat image such as, for example, the blue sky is displayed on the screen, the activity of the screen is low. Further, where the activity is low, the inter-frame difference additional amount does not exhibit a great variation between adjacent motion search points, but where the activity is high, the magnitude of the inter-frame difference additional amount exhibits a great difference between adjacent motion search points.

The activity is represented as an intra evaluation value. The intra evaluation value is a value used, for example, when intra/inter discrimination is performed, and is calculated by the calculation section 53. Then, the motion predictive discriminator 51 outputs the activity to the motion searcher 10.

In particular, the calculation section 53 calculates an average value of picture element values of an original image MB and a variance with regard to the average value, and outputs a high intra-picture evaluation value when the screen is complex (when the activity is high), but outputs a low intra-picture evaluation value when the screen is flat (when the activity is low).

In the MPEG coding apparatus 40c of the construction described above, in inter-picture coding, block matching between search MBs and original image MBs is performed within a search range, and motion vectors are calculated. Here, the additional amount to be added to a motion vector is controlled to a high value when the activity is high, but controlled to a low value when the activity is low.

Then, for each original image MB, motion vectors are calculated and stored into the frame memory 50k, and inputted image data are coded with a motion vector at the preceding timing read out from the frame memory 50k and are outputted as an MPEG stream.

Where the activity is used in this manner, the magnitude of the additional amount can be adjusted with a higher efficiency.

Further, an additional amount is added to a motion vector in the stage of a motion search in this manner similarly as in the first embodiment, and consequently, complicated calculation is unnecessary. Furthermore, since the magnitude of the additional amount is adjustable, the information amount of motion vectors can be reduced while the accuracy of the motion vectors is maintained.

Besides, since the processing speed can be augmented as a result of the simplification of the correction processing in this manner, the search range of an original image picture can be expanded. Accordingly, an object body which moves swiftly can be caught, and this makes a motion of the screen smoother and augments the visibility significantly.

It is to be noted that, as a value of the activity, a value obtained separately by calculation may be used in place of the intra-picture evaluation value.

D. Description of the Fourth Embodiment of the Present Invention

Figure 12:
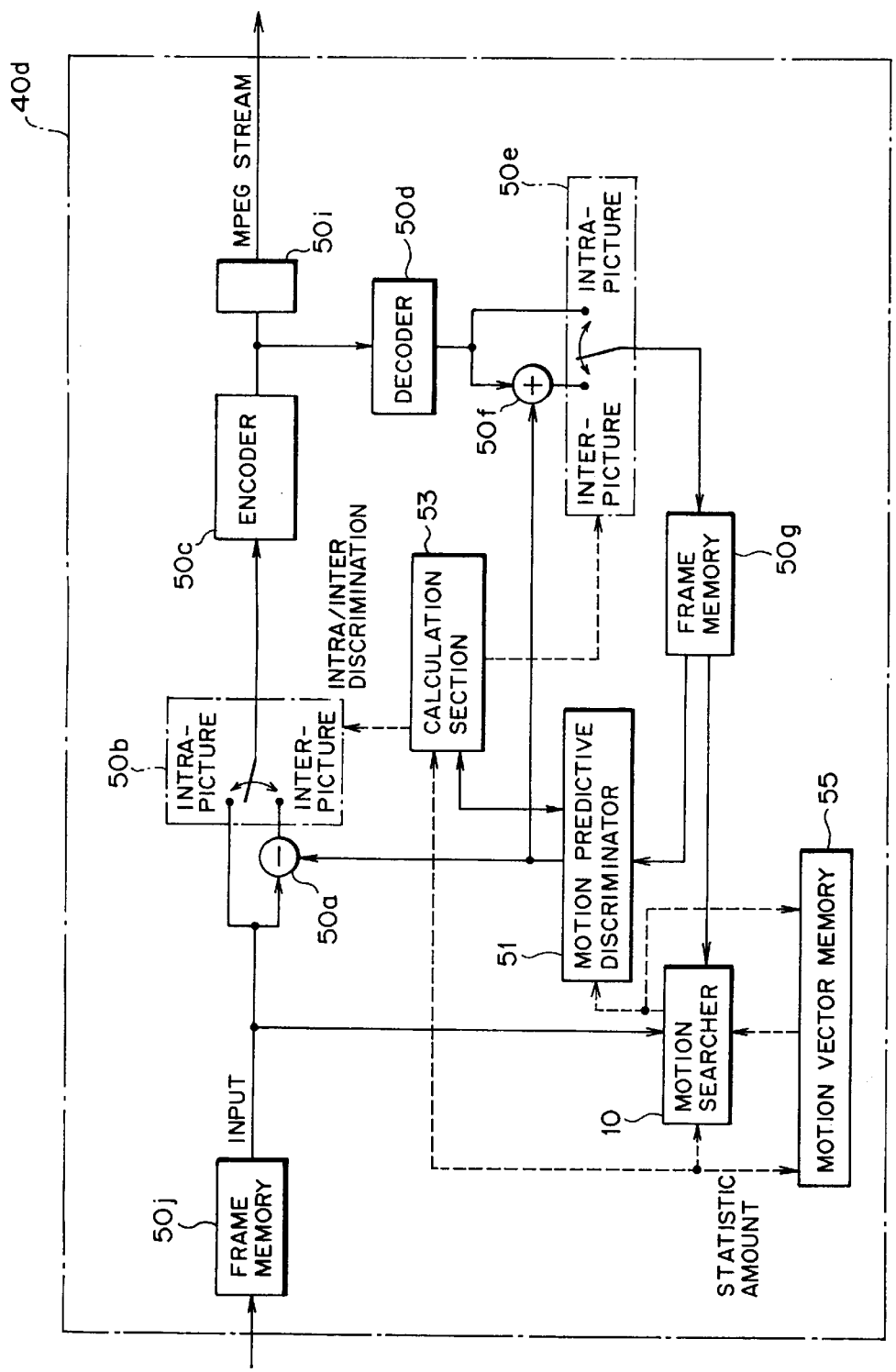
FIG. 12 is a block diagram of an MPEG coding apparatus according to a fourth embodiment of the present invention.

FIG. 12 is a block diagram of an MPEG coding apparatus 40d according to the fourth embodiment of the present invention. The MPEG coding apparatus 40d shown in FIG. 12 is similar to the MPEG coding apparatus 40 (refer to FIG. 1), and compresses original images MB of 16×16 picture elements inputted thereto in a unit of an MB in accordance with the MPEG2 system and sends out the compressed original image MBs. The MPEG coding apparatus 40d includes a motion vector memory 55, and motion vectors stored in the motion vector memory 55 are read out by the calculation section 53. The calculation section 53 thus calculates information regarding whether or not the directions of motion vectors are similar to each other, and outputs the information to the motion searcher 10.

It is to be noted that, in FIG. 12, like reference characters to those described hereinabove with reference to FIG. 1 denote like elements or elements having like functions and further overlapping description of them is omitted herein to avoid redundancy.

More specifically, the additional amount arithmetic operation section 12 (refer to FIG. 1) in the motion searcher 10 sets the additional amount to a value which originates from an average value of directions indicated by motion vectors in the past and a variance value regarding the average value. Thus, the magnitude (weight) of the additional amount is varied depending upon motion vector information of a preceding coded picture obtained already as a result of performance of a motion search or motion vector information of a current coded picture.

In particular, motion vectors obtained by a motion search and stored in the motion vector memory 55 are read out and a variance value of the motion vectors is calculated by the calculation section 53. When the motion vectors are similar to each other (the variance value of them is low), the calculation section 53 discriminates that motion prediction is favorable and varies the additional amount so as to be reduced, but on the contrary when the motion vectors are not similar to each other (the variance value of them is high), the calculation section 53 varies the additional amount so as to be increased.

Further, when the motion is great (the average value of motion vectors is high), the recognition degree in observation of the screen is lower than when the motion is small (the average value of motion vectors is low), and consequently, the additional value is varied so that it increases as the magnitude of the motion increases.

In the MPEG coding apparatus 40d having the construction described above, in inter-picture coding, block matching of original image MBs and search MBs is performed within a search range, and motion vectors are calculated.

The additional value to be added to motion vectors is set to a low value where the variance value with regard to the motion vectors is low but is set to a high value where the variance value is high. Further, where the average value of motion vectors is high, the additional amount is set to a high value, but where the average value of motion vectors is low, the additional amount is set to a low value.

Then, for each original image MB, motion vectors are calculated and stored into the frame memory 50k, and inputted image data are coded with a motion vector at the preceding timing read out from the frame memory 50k and are outputted as an MPEG stream.

Where a variance or an average value of motion vectors is used in this manner, the magnitude of the additional amount can be adjusted with a higher efficiency.

Further, an additional amount is added to a motion vector in the stage of a motion search in this manner similarly as in the first embodiment, and consequently, complicated calculation is unnecessary. Furthermore, since the magnitude of the additional amount is adjustable, the information amount of motion vectors can be reduced while the accuracy of the motion vectors is maintained.

Besides, since the processing speed can be augmented as a result of the simplification of the correction processing in this manner, the search range of an original image picture can be expanded. Accordingly, an object body which moves swiftly can be caught, and this makes a motion of the screen smoother and augments the visibility significantly.

E. Others

Subsequently, an example of specific values is described. FIG. 13 is a table illustrating an example of coded data and indicates a motion vector generation information amount and a ratio of the motion vector generation information amount to the entire generation information amount. The data are coded data at the rate of 2 Mbps and obtained by coding a scene of the surface of water which exhibits very small waves and whose motion prediction according to the MPEG system is comparatively difficult. Further, the data represent generation information amounts for approximately 10 seconds (300 pictures), and each generation information amount is represented in a unit of a bit.

The data illustrated in FIG. 13 indicate that, where they are not controlled at all, 80% of the coded information are occupied by the information of motion vectors, and the amount allocated as inter-frame difference information is very small.

Figure 14:
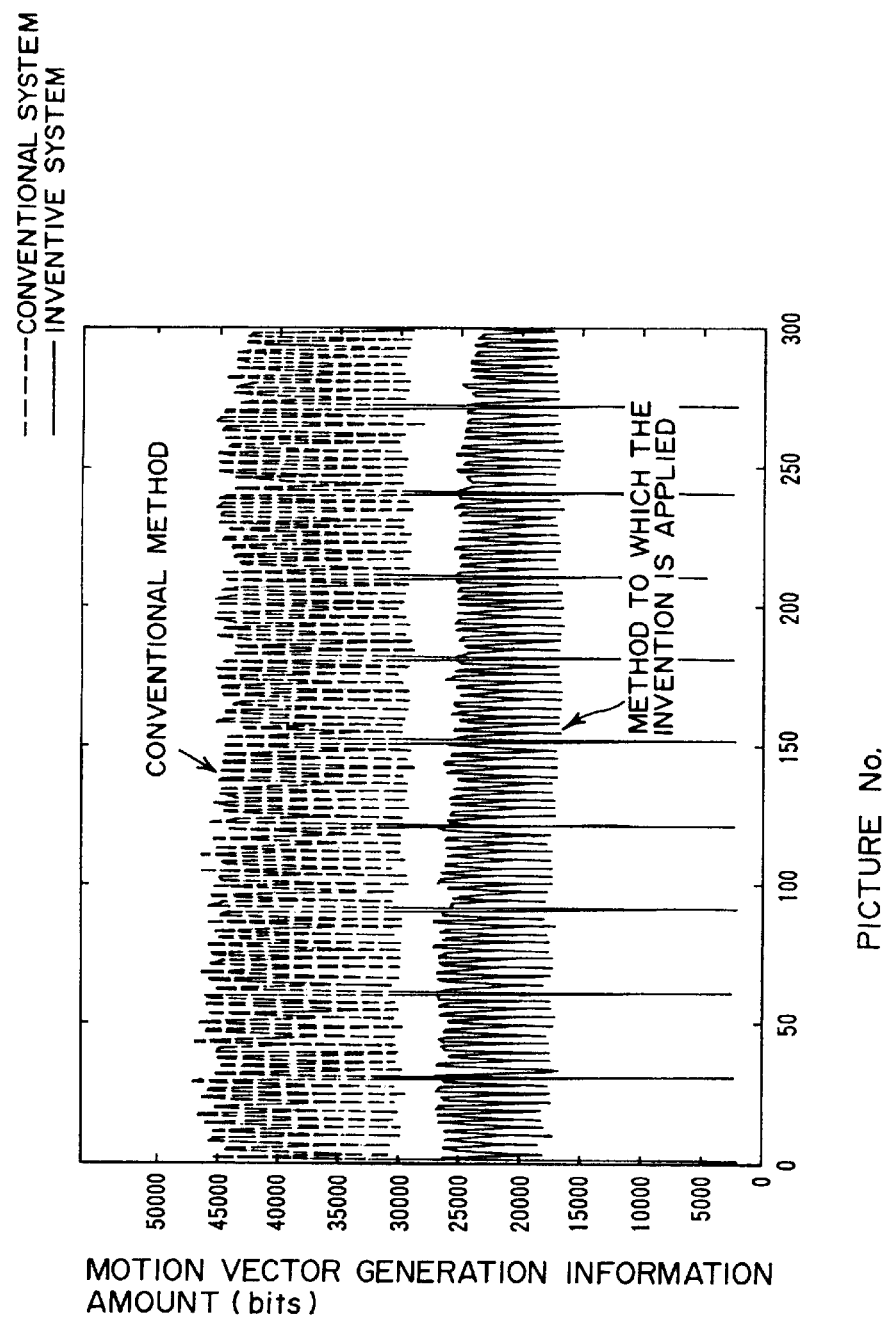
FIG. 14 is a waveform diagram illustrating a variation of the motion vector generation information amount.
Figure 15:
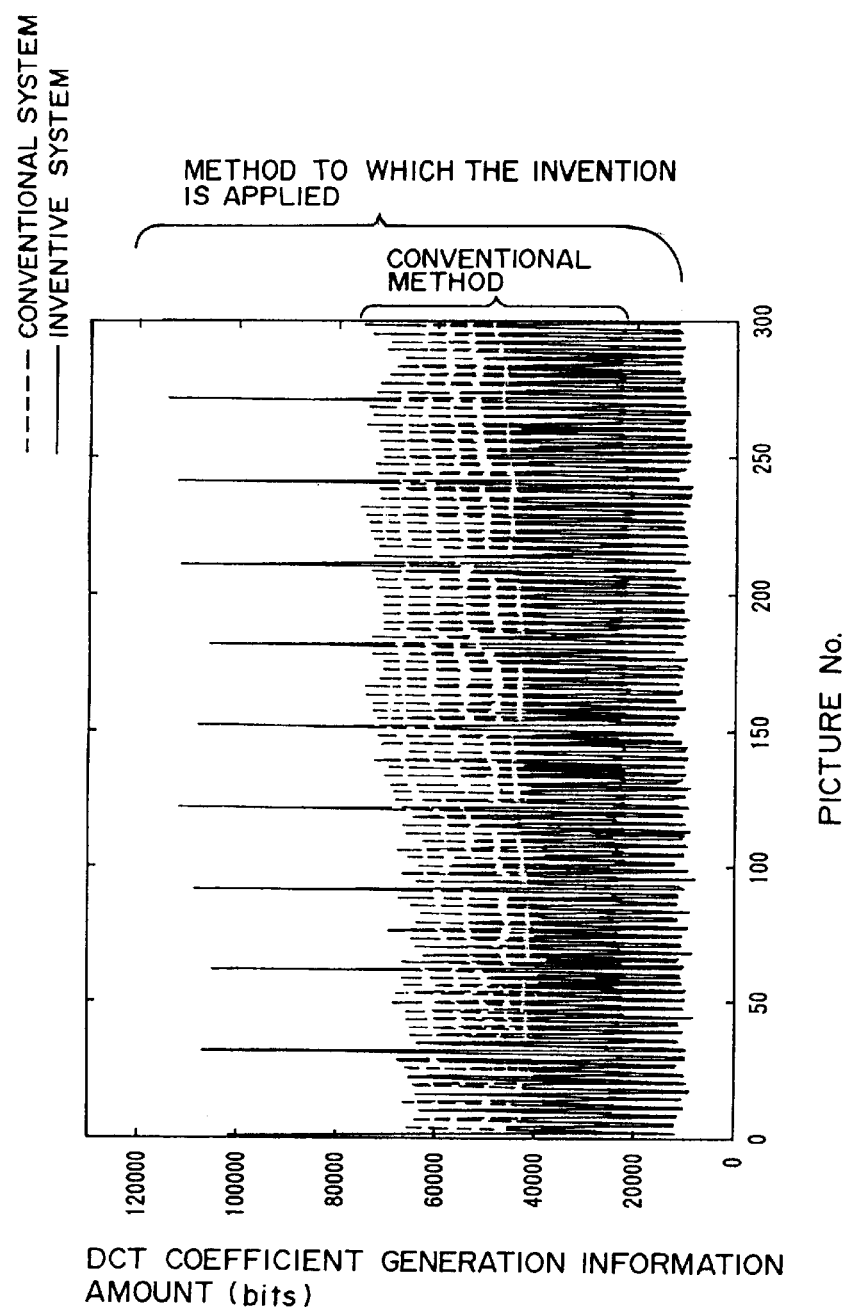
FIG. 15 is a waveform diagram illustrating a variation of the difference generation information amount.
Figure 16:
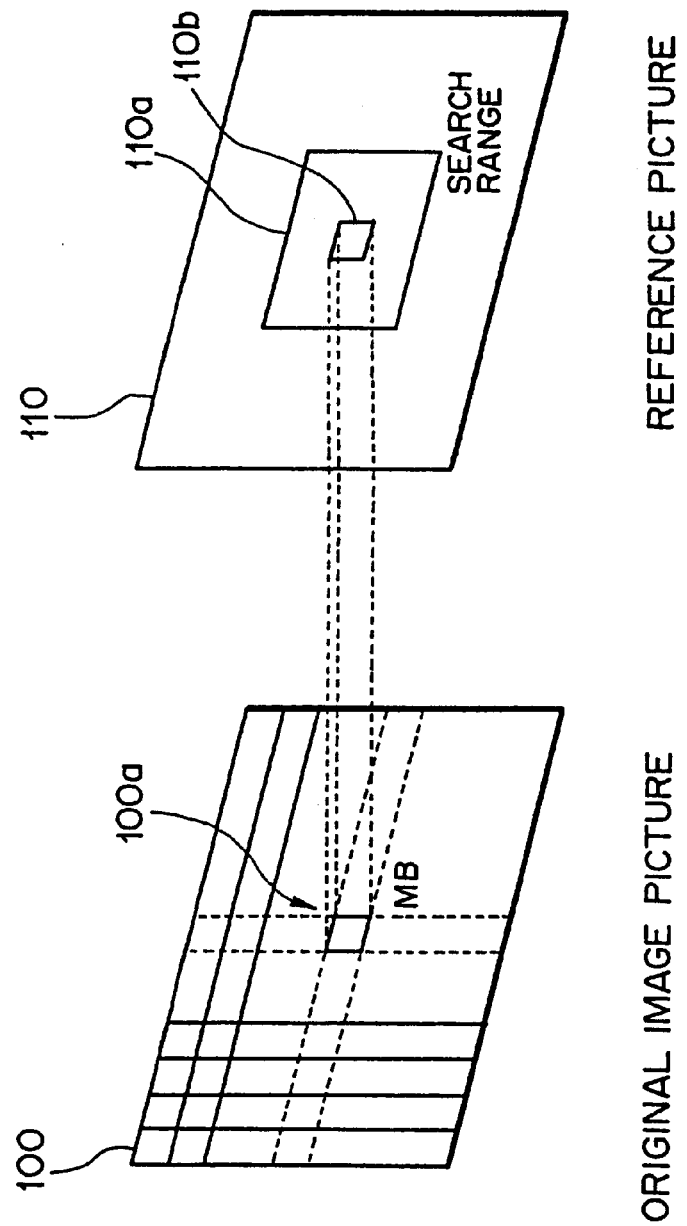
FIG. 16 is a diagrammatic view illustrating a motion search.
Figure 17:
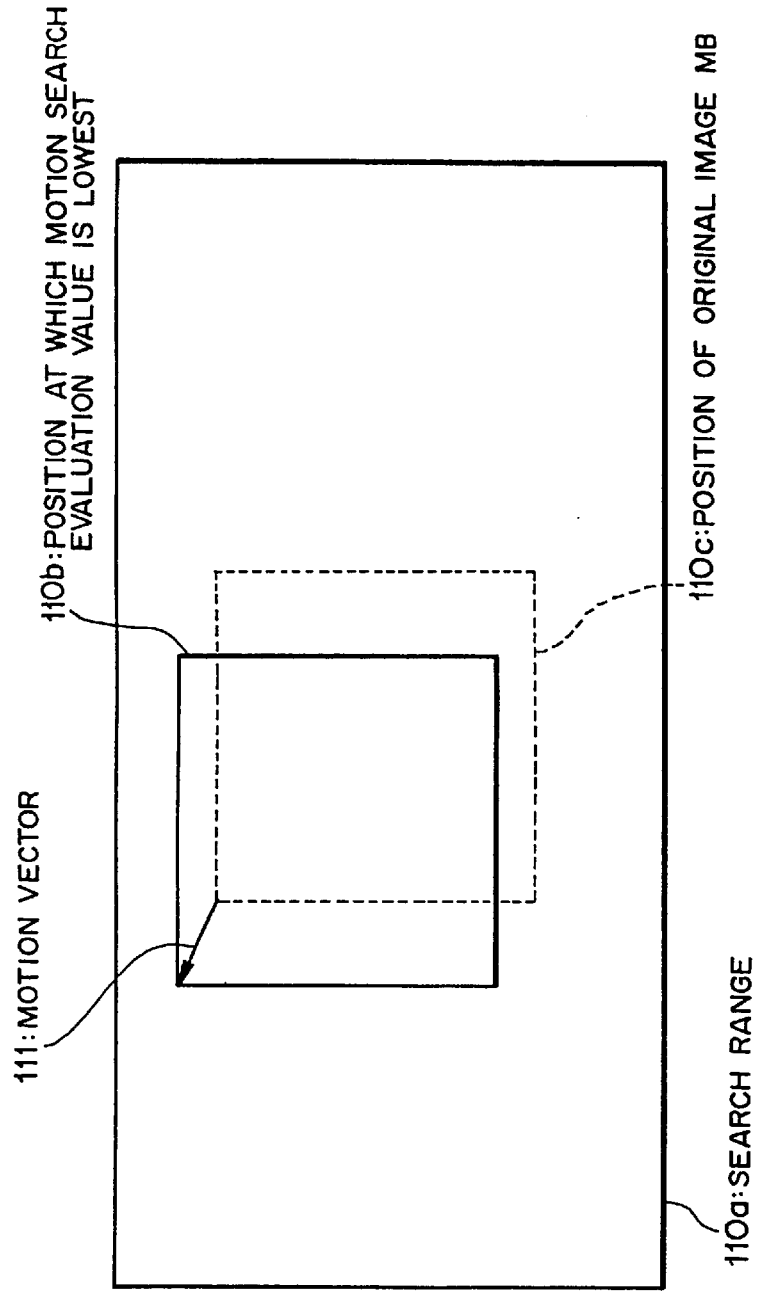
FIG. 17 is a diagrammatic view illustrating a motion vector.
Figure 18:
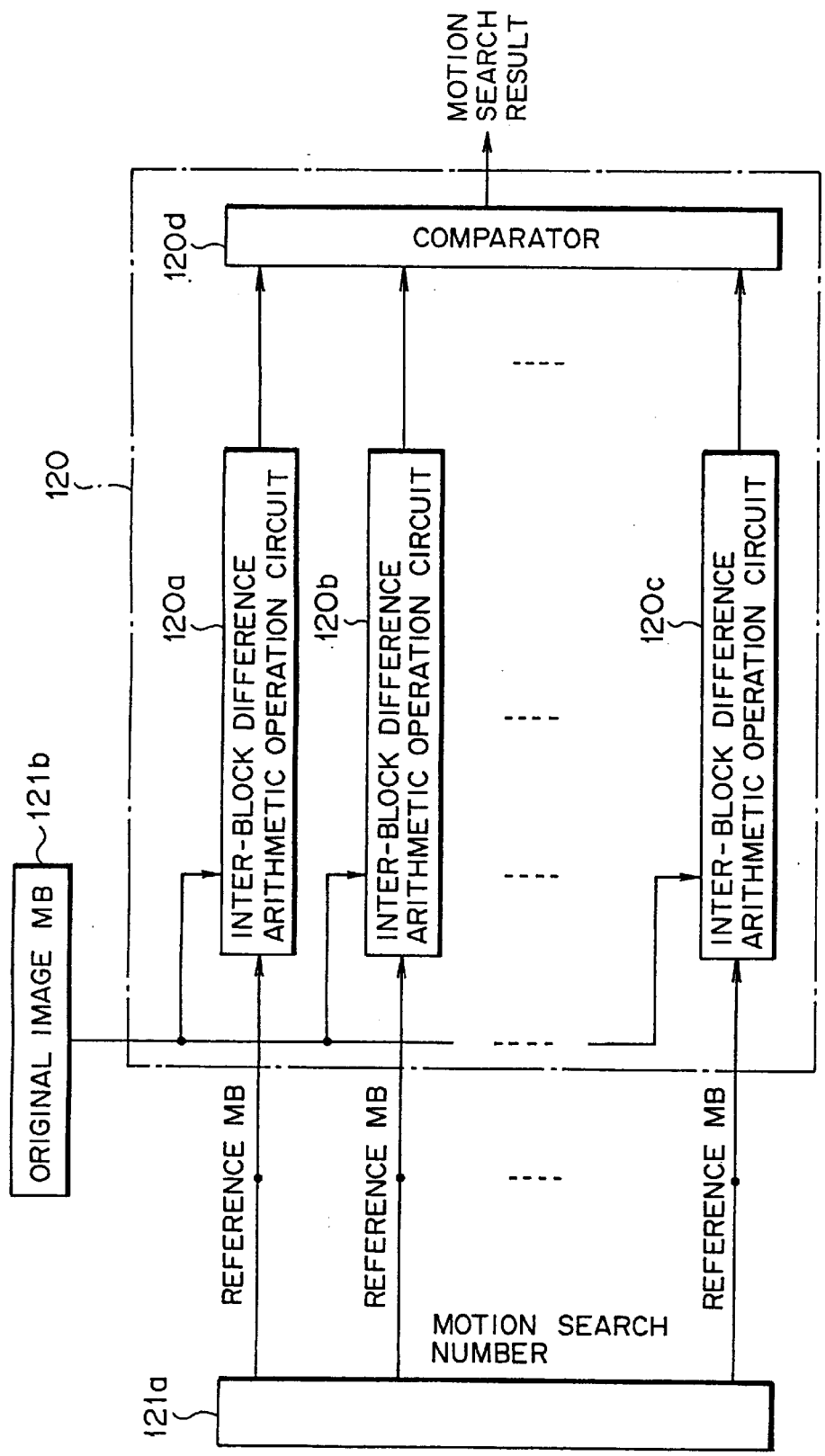
FIG. 18 is a block diagram of a motion searcher illustrating block matching.
Figure 19:
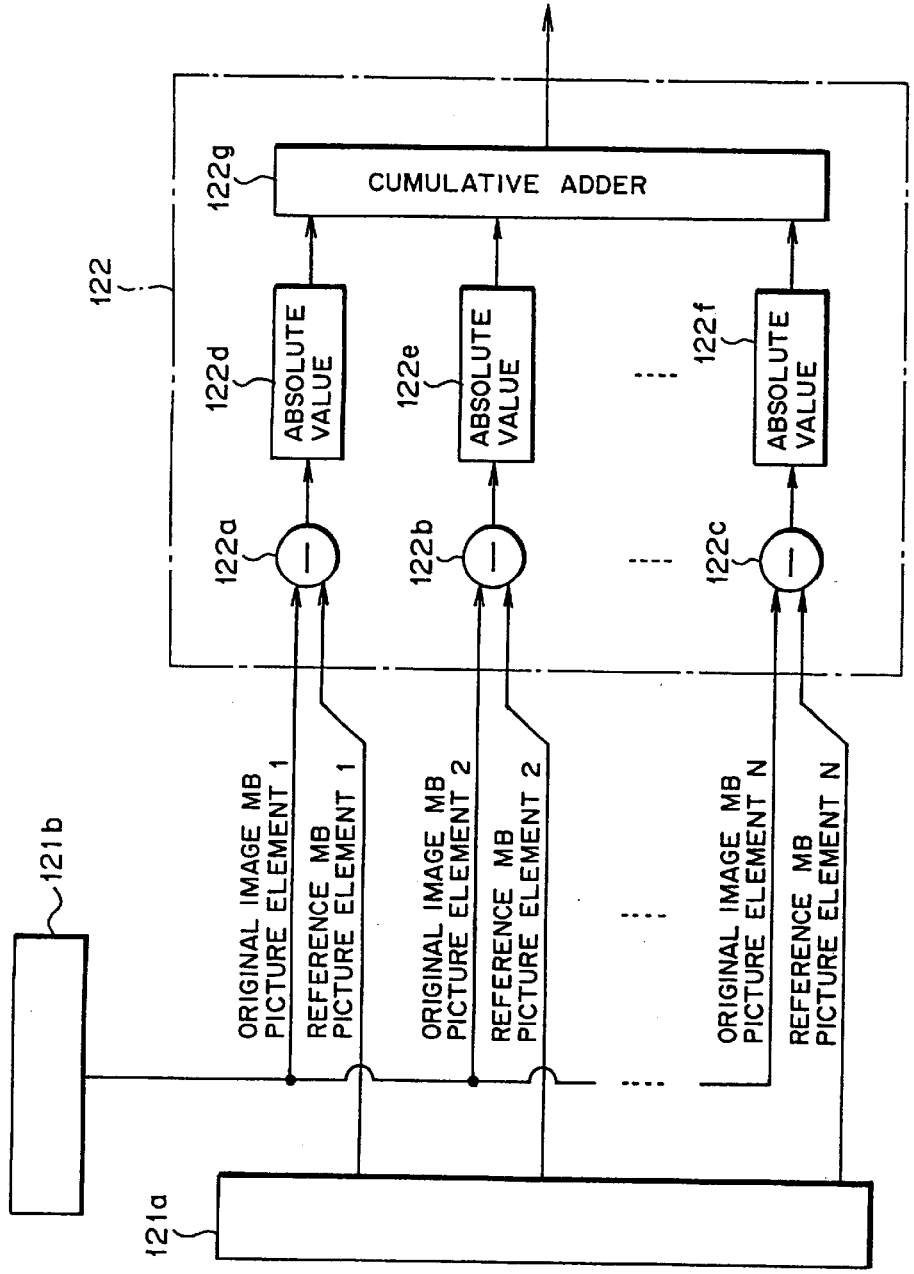
FIG. 19 is a block diagram of a difference absolute value sum arithmetic operation circuit.
Figure 20:
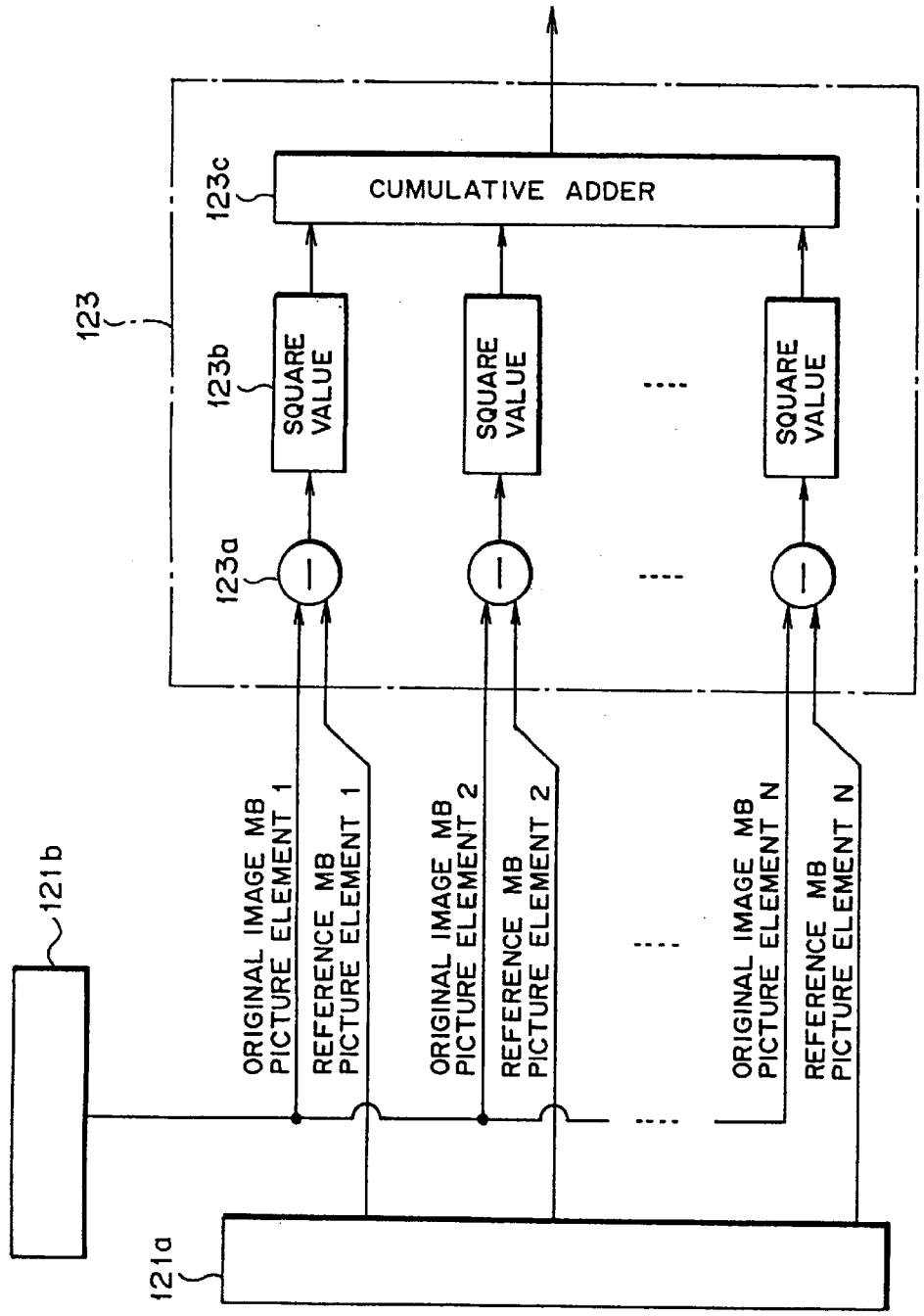
FIG. 20 is a block diagram of a difference square sum arithmetic operation circuit.
Figure 21:
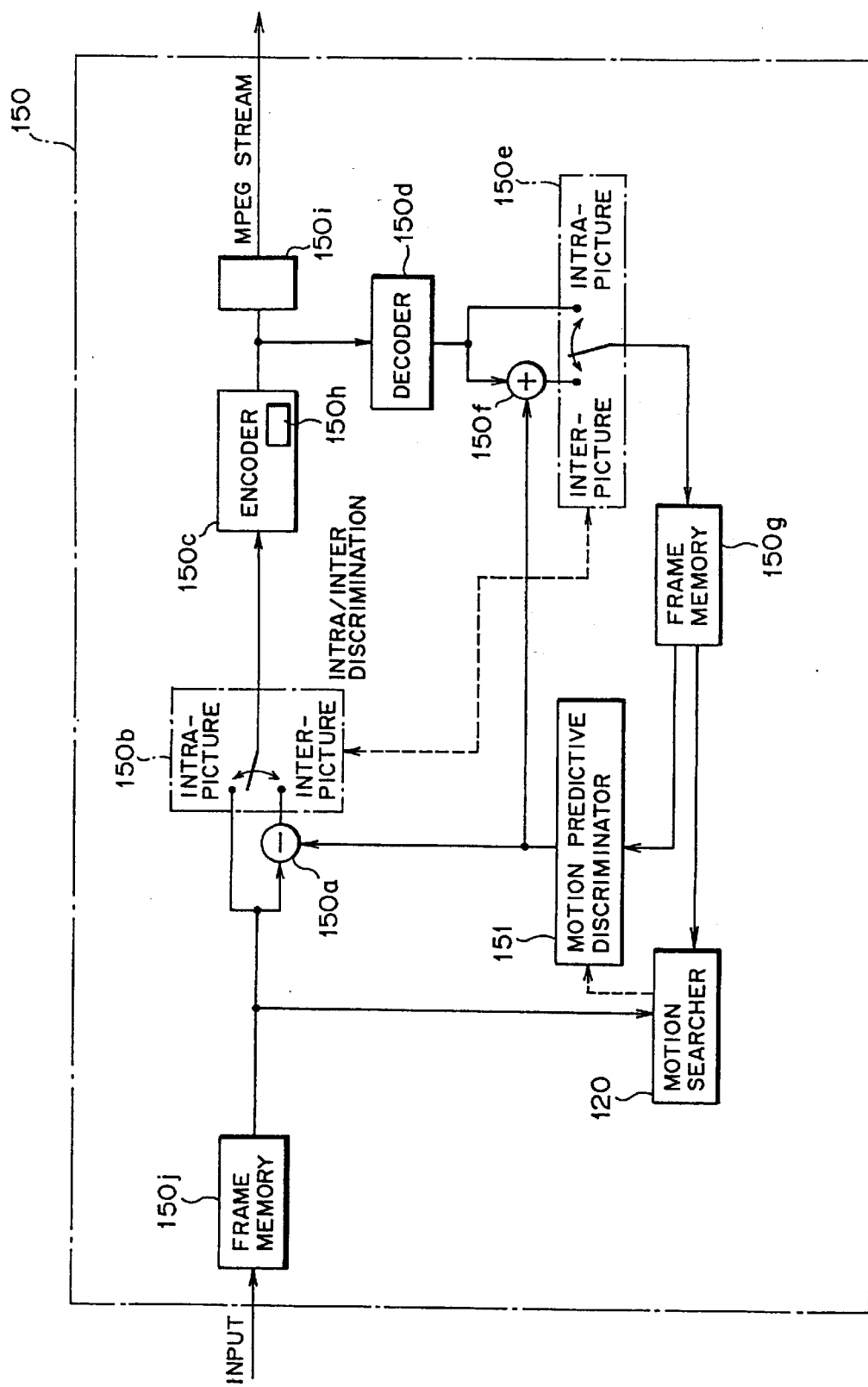
FIG. 21 is a block diagram of an MPEG coding apparatus.

FIG. 14 illustrates a variation of the motion vector generation information amount, and FIG. 15 illustrates a variation of the difference (DCT coefficient) generation information amount. The axes of abscissa of the variation curves shown in FIGS. 14 and 15 represent the picture number and indicate that pictures are inputted successively, and the axis of ordinate represent the motion vector generation information amount. The upper curves in FIGS. 14 and 15 represent the motion vector generation information amount where the conventional system is used, and the lower curves represent the motion vector generation information amount where the present invention is applied. Accordingly, as seen from the curves shown in FIGS. 14 and 15, where the present invention is applied, the information amount generated is reduced.

Further, since the control of adjusting the directions of motion vectors and the suppression of the generation information amount of motion vectors allow allocation of an amount of information equal to the reduced information amount thereby to the inter frame difference information, also the picture quality is augmented, and besides, also the magnitude of an average quantization scale is reduced significantly.

It is to be noted that the present invention is not limited to the embodiments and the modifications described above but can be carried out in various forms without departing from the scope and the spirit of the present invention.

For example, the motion search number may be 256 or any value other than 256. Where a higher value is used for the motion search number, the impression from a resulting screen becomes smoother.

Further, the constants a and described hereinabove may have various values depending upon the principle in design. Further, such expressions as given as expressions (3) to (6) are not limited to the specific calculation expressions, and expressions of some other form based on values of absolute value arithmetic operation may be used as such.

In addition, as regards a setting manner of the additional amount described above, the individual parameters need not be used independently of each other to set the additional amount, but a plurality of parameters may be used in combination. Also in this instance, similar advantages can be achieved.

It is to be noted that a reference MB indicated in FIGS. 2, 3, 4, 6, 10 and 18 signifies a search MB, and the two MBs are the same MB. Further, while "0" is indicated in the block of the information amount control section 52 in FIG. 10, this signifies zero resetting.

In addition, while it is described that, when the additional amount arithmetic operation section 12 sets an additional amount, the value of the additional amount originates from a component of a motion vector, a coding bit rate, the magnitude of a quantization coefficient, a motion vector information amount, a total information amount, an activity value, an average value or a variance value, the value which originates from a particular value may be the particular value itself or may be a value obtained by multiplying the particular value by some constant.

Further, the timings 1, 2, 3 and so forth are used to distinct the order of such timings for the convenience of description, and the present invention shall not be restricted at all by the representation.

What is claimed is:

1. A motion vector searcher for moving picture coding which calculates difference amounts between an original image macro block obtained by dividing original image data inputted thereto and a plurality of search macro blocks provided in reference image data to produce a plurality of first motion vectors representative of positions of the plurality of search macro blocks from the same position as a position of the original image macro block, comprising:

a difference arithmetic operation section calculating and outputting the difference amounts between the original image macro block and the plurality of search macro blocks;

an additional amount arithmetic operation section connected with said difference arithmetic operation section and outputting a correction difference amount which is obtained by adding an additional amount, the additional amount which relies upon a horizontal component and a vertical component of each of the plurality of first motion vectors and a state of coding, to each of the difference amounts outputted from the difference arithmetic operation section and outputting a plurality of second motion vectors based on a plurality of adjacent search macro blocks and the corresponding correction difference amounts; and a motion vector determination section connected with said additional amount arithmetic operation section and determining an optimum motion vector which exhibits the highest one of correlation degrees between the original image block and the search macro blocks, wherein said additional amount arithmetic operation section sets the additional amount for the original image macro block at a predetermined position of a coded picture which is a unit of information processing such that magnitude of the additional amount is varied using motion vector information of the original image macro block at the same position as that of a preceding coded picture coded in the past, and using average motion vector information of the preceding coded picture and the motion vector information already searched from the coded picture.

2. The motion vector searcher according to claim 1, wherein said difference arithmetic operation section includes a plurality of inter-block difference arithmetic operation sections outputting differences between data regarding the search macro blocks and data regarding the original image block as the difference amounts.

3. The motion vector searcher according to claim 2, wherein said additional amount arithmetic operation section includes a plurality of additional amount arithmetic operation circuits individually connected to said plurality of inter-block difference arithmetic operation sections of said difference arithmetic operation section and outputting the correction difference amounts and outputting the motion vectors based on the correction difference amounts for motion vectors which are inputted from the outside.

4. The motion vector searcher according to claim 3, wherein said additional amount arithmetic operation section sets the additional amount such that the additional amount includes a value which originates from the horizontal component and the vertical component of the motion vector and increases as the horizontal component and the vertical component of the motion vector increase.

5. The motion vector searcher according to claim 3, wherein said additional amount arithmetic operation section sets the additional amount such that the additional amount includes a value which originates from an activity value representative of complexity of image variation and increases as the activity value increases.

6. The motion vector searcher according to claim 3, wherein said additional amount arithmetic operation section is capable of resetting the additional amount for each coded picture which is a unit of image processing.

7. A motion vector searcher for moving picture coding which calculates difference amounts between an original image macro block obtained by dividing original image data inputted thereto and a plurality of search macro blocks provided in reference image data to produce a plurality of first motion vectors representative of positions of the plurality of search macro blocks from the same position as a position of the original image macro block, comprising:

a difference arithmetic operation section calculating and outputting the difference amounts between the original image macro block and the plurality of search macro blocks;

an additional amount arithmetic operation section connected with said difference arithmetic operation section and outputting a correction difference amount which is obtained by adding an additional amount, the additional amount which relies upon a horizontal component and a vertical component of each of the plurality of first motion vectors and a state of coding, to each of the difference amounts outputted from the difference arithmetic operation section and for outputting a plurality of second motion vectors based on a plurality of adjacent search macro blocks and the corresponding correction difference amounts; and a motion vector determination section connected with said additional amount arithmetic operation section and determining an optimum motion vector which exhibits the highest one of correlation degrees between the original image block and the search macro blocks, wherein said difference arithmetic operation section includes a plurality of inter-block difference arithmetic operation sections outputting differences between data regarding the search macro blocks and data regarding the original image block as the difference amounts, wherein said additional amount arithmetic operation section includes a plurality of additional amount arithmetic operation circuits individually connected with said plurality of inter-block difference arithmetic operation sections of said difference arithmetic operation section and outputting the correction difference amounts and outputting the motion vectors based on the correction difference amounts for motion vectors which are inputted from the outside, and wherein said additional amount arithmetic operation section sets the additional amount such that the additional amount includes a value which originates from variation amounts between the horizontal component and the vertical component of the motion vector and a horizontal component and a vertical component of a preceding motion vector produced in the past and increases as the variation amounts increase.

8. A motion vector searcher for moving picture coding which calculates difference amounts between an original image macro block obtained by dividing original image data inputted thereto and a plurality of search macro blocks provided in reference image data to produce a plurality of first motion vectors representative of positions of the plurality of search macro blocks from the same position as a position of the original image macro block, comprising:

a difference arithmetic operation section calculating and outputting the difference amounts between the original image macro block and the plurality of search macro blocks;

an additional amount arithmetic operation section connected with said difference arithmetic operation section and outputting a correction difference amount which is obtained by adding an additional amount, the additional amount which relies upon a horizontal component and a vertical component of each of the plurality of first motion vectors and a state of coding, to each of the difference amounts outputted from the difference arithmetic operation section and for outputting a plurality of second motion vectors based on a plurality of adjacent search macro blocks and the corresponding correction difference amounts; and a motion vector determination section connected with said additional amount arithmetic operation section and determining an optimum motion vector which exhibits the highest one of correlation degrees between the original image block and the search macro blocks, wherein wherein said difference arithmetic operation section includes a plurality of inter-block difference arithmetic operation sections outputting differences between data regarding the search macro blocks and data regarding the original image block as the difference amounts, wherein said additional amount arithmetic operation section includes a plurality of additional amount arithmetic operation circuits individually connected with said plurality of inter-block difference arithmetic operation sections of said difference arithmetic operation section and outputting the correction difference amounts and outputting the motion vectors based on the correction difference amounts for motion vectors which are inputted from the outside, and wherein said additional amount arithmetic operation section sets the additional amount such that the additional amount includes a value which originates from a coding bit rate at which moving picture coding is performed and increases as the coding bit rate decreases.

9. A motion vector searcher for moving picture coding which calculates difference amounts between an original image macro block obtained by dividing original image data inputted thereto and a plurality of search macro blocks provided in reference image data to produce a plurality of first motion vectors representative of positions of the plurality of search macro blocks from the same position as a position of the original image macro block, comprising:

a difference arithmetic operation section calculating and outputting the difference amounts between the original image macro block and the plurality of search macro blocks;

an additional amount arithmetic operation section connected with said difference arithmetic operation section and outputting a correction difference amount which is obtained by adding an additional amount, the additional amount which relies upon a horizontal component and a vertical component of each of the plurality of first motion vectors and a state of coding, to each of the difference amounts outputted from the difference arithmetic operation section and for outputting a plurality of second motion vectors based on a plurality of adjacent search macro blocks and the corresponding correction difference amounts; and a motion vector determination section connected with said additional amount arithmetic operation section and determining an optimum motion vector which exhibits the highest one of correlation degrees between the original image block and the search macro blocks, wherein wherein said difference arithmetic operation section includes a plurality of inter-block difference arithmetic operation sections outputting differences between data regarding the search macro blocks and data regarding the original image block as the difference amounts, wherein said additional amount arithmetic operation section includes a plurality of additional amount arithmetic operation circuits individually connected with said plurality of inter-block difference arithmetic operation sections of said difference arithmetic operation section and outputting the correction difference amounts and outputting the motion vectors based on the correction difference amounts for motion vectors which are inputted from the outside, and wherein said additional amount arithmetic operation section sets the additional amount such that the additional amount includes a value which originates from the magnitude of a quantization coefficient of discrete cosine transform to be performed for each of the macro blocks and increases as the quantization coefficient increases.

10. A motion vector searcher for moving picture coding which calculates difference amounts between an original image macro block obtained by dividing original image data inputted thereto and a plurality of search macro blocks provided in reference image data to produce a plurality of first motion vectors representative of positions of the plurality of search macro blocks from the same position as a position of the original image macro block, comprising:

a difference arithmetic operation section calculating and outputting the difference amounts between the original image macro block and the plurality of search macro blocks;

an additional amount arithmetic operation section connected with said difference arithmetic operation section and outputting a correction difference amount which is obtained by adding an additional amount, the additional amount which relies upon a horizontal component and a vertical component of each of the plurality of first motion vectors and a state of coding, to each of the difference amounts outputted from the difference arithmetic operation section and for outputting a plurality of second motion vectors based on a plurality of adjacent search macro blocks and the corresponding correction difference amounts; and a motion vector determination section connected with said additional amount arithmetic operation section and determining an optimum motion vector which exhibits the highest one of correlation degrees between the original image block and the search macro blocks, wherein wherein said difference arithmetic operation section includes a plurality of inter-block difference arithmetic operation sections outputting differences between data regarding the search macro blocks and data regarding the original image block as the difference amounts, wherein said additional amount arithmetic operation section includes a plurality of additional amount arithmetic operation circuits individually connected with said plurality of inter-block difference arithmetic operation sections of said difference arithmetic operation section and outputting the correction difference amounts and outputting the motion vectors based on the correction difference amounts for motion vectors which are inputted from the outside, and wherein said additional amount arithmetic operation section sets the additional amount such that the additional amount includes a value which originates from a motion vector information amount by which the motion vectors are generated and a total information amount by which coded data of a moving picture are generated and increases as a ratio of the motion vector information amount to the total information amount increases.

11. A motion vector searcher for moving picture coding which calculates difference amounts between an original image macro block obtained by dividing original image data inputted thereto and a plurality of search macro blocks provided in reference image data to produce a plurality of first motion vectors representative of positions of the plurality of search macro blocks from the same position as a position of the original image macro block, comprising:

a difference arithmetic operation section calculating and outputting the difference amounts between the original image macro block and the plurality of search macro blocks;

an additional amount arithmetic operation section connected with said difference arithmetic operation section and outputting a correction difference amount which is obtained by adding an additional amount, the additional amount which relies upon a horizontal component and a vertical component of each of the plurality of first motion vectors and a state of coding, to each of the difference amounts outputted from the difference arithmetic operation section and for outputting a plurality of second motion vectors based on a plurality of adjacent search macro blocks and the corresponding correction difference amounts; and a motion vector determination section connected with said additional amount arithmetic operation section and determining an optimum motion vector which exhibits the highest one of correlation degrees between the original image block and the search macro blocks, wherein wherein said difference arithmetic operation section includes a plurality of inter-block difference arithmetic operation sections outputting differences between data regarding the search macro blocks and data regarding the original image block as the difference amounts, wherein said additional amount arithmetic operation section includes a plurality of additional amount arithmetic operation circuits individually connected with said plurality of inter-block difference arithmetic operation sections of said difference arithmetic operation section and outputting the correction difference amounts and outputting the motion vectors based on the correction difference amounts for motion vectors which are inputted from the outside, and wherein said additional amount arithmetic operation section sets the additional amount such that the additional amount includes a value which originates from at least one of an average value of directions indicated by motion vectors in the past and a variance with regard to the average value.

12. A motion vector search method for moving picture coding wherein difference amounts between an original image macro block obtained by dividing original image data inputted thereto and a plurality of search macro blocks provided in reference image data are calculated to produce a plurality of first motion vectors representative of positions of the plurality of search macro blocks from the same position as a position of the original image macro block, comprising:

a difference arithmetic operation calculating differences between data regarding the plurality of search macro blocks and data regarding the original image macro block and outputting the differences as the plurality of difference amounts;

an additional amount arithmetic operation outputting correction difference amounts each of which is obtained by adding an additional amount, additional amounts which rely upon horizontal components and vertical components of each of the plurality of first motion vectors and a state of coding, to the difference amounts outputted in the difference arithmetic operation, to output a plurality of second motion vectors based on a plurality of adjacent search macro blocks and the corresponding correction difference amounts; and a motion vector determination determining an optimum motion vector which has the minimum information amount from among the plurality of second motion vectors, and exhibits the highest one of correlation degrees between the original image block and the search macro blocks, wherein said additional amount arithmetic operation of setting the additional amount for the original image macro block at a predetermined position of a coded picture which is a unit of information processing such that magnitude of the additional amount is varied using motion vector information of the original image macro block at the same position as that of a preceding coded picture coded in the past, and using average motion vector information of the preceding coded picture and the motion vector information already searched from the coded picture.

13. A moving picture coding apparatus for moving picture coding which calculates difference amounts between an original image macro block obtained by dividing original image data inputted thereto and a plurality of search macro blocks provided in reference image data to produce motion vectors representative of positions of the plurality of reference macro blocks from the same position as a position of the original image macro block, and performs motion compensation, comprising:

a difference arithmetic operation section calculating and outputting the difference amounts between the original image macro block and the plurality of search macro blocks;

an additional amount arithmetic operation section connected with said difference arithmetic operation section and outputting a correction difference amount which is obtained by adding an additional amount, the additional amount which relies upon a horizontal component and a vertical component of each of the motion vectors and a state of coding, to each of the difference amounts outputted from the difference arithmetic operation section and outputting a plurality of second motion vectors based on a plurality of adjacent search macro blocks and the corresponding correction difference amounts; and a motion vector determination section connected with said additional amount arithmetic operation section and determining an optimum motion vector which exhibits the highest one of correlation degrees between the original image block and the search blocks;

said additional amount arithmetic operation section setting the additional amount for the original image macro block at a predetermined position of a coded picture which is a unit of information processing such that the magnitude of the additional amount is varied using motion vector information of the original image macro block at the same position as that of a preceding coded picture coded in the past, average motion vector information of the preceding coded picture and the motion vector information searched already from the coded picture.

14. A moving picture coding apparatus for moving picture coding which calculates difference amounts between an original image macro block obtained by dividing original image data inputted thereto and a plurality of search macro blocks provided in reference image data to produce a plurality of first motion vectors representative of positions of the plurality of search macro blocks from the same position as a position of the original image macro block to perform motion compensation, comprising:

a difference arithmetic operation section calculating and outputting the difference amounts between the original image macro block and the plurality of search macro blocks;

an additional amount arithmetic operation section connected with said difference arithmetic operation section and outputting a correction difference amount which is obtained by adding an additional amount, the additional amounts which relies upon a horizontal component and a vertical component of each of the plurality of first motion vectors and a state of coding, to each of the difference amounts outputted from the difference arithmetic operation section and outputting a plurality of second motion vectors based on a plurality of adjacent search macro blocks and the corresponding correction difference amounts; and a motion vector determination section connected with said additional amount arithmetic operation section and determining an optimum motion vector which exhibits the highest one of correlation degrees between the original image block and the search macro blocks, wherein said additional amount arithmetic operation section sets the additional amount for the original image macro block at a predetermined position of a coded picture which is a unit of information processing such that magnitude of the additional amount is varied using motion vector information of the original image macro block at the same position as that of a preceding coded picture coded in the past, average motion vector information of the preceding coded picture and the motion vector information already searched from the coded picture.

* * * * *